(12) United States Patent
Mann et al.

(10) Patent No.: US 12,547,574 B2
(45) Date of Patent: Feb. 10, 2026

(54) I/O CARRIER AND BACKPLANE FOR INDUSTRIAL PROCESS CONTROL SYSTEMS

(71) Applicant: FISHER-ROSEMOUNT SYSTEMS, INC., Round Rock, TX (US)

(72) Inventors: Richard Mann, Austin, TX (US); Charles Eastberg, Round Rock, TX (US); Scott Slade, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 18/891,841

(22) Filed: Sep. 20, 2024

(65) Prior Publication Data

US 2025/0110911 A1    Apr. 3, 2025

Related U.S. Application Data

(60) Provisional application No. 63/542,002, filed on Oct. 2, 2023.

(51) Int. Cl.
*G06F 1/18*      (2006.01)
*G06F 11/20*     (2006.01)
(Continued)

(52) U.S. Cl.
CPC .................................. *G06F 13/409* (2013.01)

(58) Field of Classification Search
None
See application file for complete search history.

(56) References Cited

U.S. PATENT DOCUMENTS 7,684,875 B2   3/2010  Jundt et al.
8,332,567 B2   12/2012 Burr et al.
(Continued)

FOREIGN PATENT DOCUMENTS

CN    111 104 262 A    5/2020

OTHER PUBLICATIONS

International Search Report and Written Opinion for Application No. PCT/US2024/047974, dated Dec. 23, 2024.
(Continued)

*Primary Examiner* — Hyun Nam
(74) *Attorney, Agent, or Firm* — MARSHALL, GERSTEIN & BORUN LLP

(57) ABSTRACT

An I/O device is configured to couple a plurality of process control field devices to a process controller controlling a process in an industrial process plant. The I/O device includes a backplane and a plurality of electronic marshalling component (EMC) slots. The EMC slots are each configured to receive a respective EMC and to receive either of (i) a first-type EMC associated with a first communication protocol or (ii) second-type EMC associated with a second communication protocol. The I/O device also includes I/O processor module slots, each communicatively coupled, via the backplane, to each of the EMC slots and to each of a first one or more connectors and a second one or more connectors in each of the EMC slots. The I/O device further includes communication ports, each communicatively coupled to the I/O processor module slots via the backplane.

20 Claims, 10 Drawing Sheets

(51) Int. Cl.
    *G06F 13/40*     (2006.01)
    *G06F 13/42*     (2006.01)

(56) References Cited

U.S. PATENT DOCUMENTS

| | | |
|---|---|---|
| 8,762,618 B2 | 6/2014 | Burr et al. |
| 8,977,851 B2 | 3/2015 | Neitzel et al. |
| 9,083,548 B2 | 7/2015 | Holmes et al. |
| 9,495,313 B2 | 11/2016 | Burr et al. |
| 12,424,527 B2 * | 9/2025 | Olson .................... H01L 24/97 |
| 2005/0195975 A1 * | 9/2005 | Kawakita ............. H04L 9/3236 |
| | | 380/30 |
| 2012/0265867 A1 * | 10/2012 | Boucher ................ H04W 4/90 |
| | | 709/223 |
| 2014/0351319 A1 * | 11/2014 | Lee ....................... G06F 9/5072 |
| | | 709/203 |
| 2015/0120972 A1 | 4/2015 | Tanimura et al. |
| 2017/0344445 A1 | 11/2017 | Vanderah et al. |
| 2017/0344451 A1 | 11/2017 | Vanderah et al. |
| 2018/0113830 A1 | 4/2018 | Sherriff et al. |
| 2019/0089461 A1 * | 3/2019 | Sun ...................... H04B 10/506 |
| 2021/0081346 A1 | 3/2021 | Nixon et al. |
| 2023/0111740 A1 | 4/2023 | Law et al. |
| 2025/0110463 A1 * | 4/2025 | Law .................... H05K 7/1477 |
| 2025/0110911 A1 * | 4/2025 | Mann .................... G06F 13/409 |

OTHER PUBLICATIONS

International Search Report and Written Opinion for Application No. PCT/US2024/047970, dated Dec. 20, 2024.

* cited by examiner

I/O CARRIER AND BACKPLANE FOR INDUSTRIAL PROCESS CONTROL SYSTEMS

TECHNICAL FIELD

The present application relates generally to process control systems and, more particularly, to a carrier and associated backplane communicatively coupling field devices to process controllers in a process control system using multiple physical layers that support different communication protocols.

BACKGROUND

Distributed process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks. The field devices, which may be, for example, valves, valve positioners, switches and transmitters (e.g., temperature, pressure, level and flow rate sensors), are located within the process environment and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART®, WirelessHART®, and FOUNDATION® Fieldbus field devices. To perform this communication, the control modules in the process controller send the control signals to various different input/output (I/O) devices, which then send these control signals over communication lines or links (communication physical layers) to the actual field devices to thereby control the operation of at least a portion of the process plant or system, e.g., to control at least a portion of one or more industrial processes running or executing within the plant or system. The I/O devices, which are also typically located within the plant environment, are generally disposed between a process controller and one or more field devices, and enable communications there-between, e.g., by converting electrical signals into digital values and vice versa. Different I/O devices are provided to support field devices that use different communication protocols. More particularly, a different I/O device is provided between a process controller and each of the field devices that use a particular communication protocol, such that a first I/O device is used to support HART field devices, a second I/O device is used to support Fieldbus field devices, a third I/O device is used to support Profibus field devices, etc. As utilized herein, field devices, controllers, and I/O devices are generally referred to as "process control devices," and are generally located, disposed, or installed in a field environment of a process control system or plant.

Still further, information from the field devices and the process controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths and typically uses a packet based communication protocol and non-time sensitive communication protocol, such as an Ethernet or IP protocol.

As an example, the DeltaV™ control system, sold by Emerson Automation Solutions, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, a maintenance view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As indicated above, a process control system can include a plurality of field devices that provide many different functional capabilities within a plant, and these field devices are communicatively coupled to process controllers using one of various different types of physical interfaces or physical layers of a communication interface. For example, a common process control communication physical interface uses a two-wire interface set up in either a point-to-point wiring connection arrangement (e.g., only one field device communicatively coupled to a particular wire interface) or in a multi-drop wiring connection arrangement (e.g., a plurality of field devices communicatively coupled to a wire interface). However, some field devices may be connected with a controller using wireless communications physical layer which may include wireless gateway and transmitter/receiver devices. Still further field devices are typically configured to communicate with the process controllers using one of various different communication protocols. These communication protocols are typically digital signal protocols but can be analog protocols (e.g., the 4-20 ma protocol) or combined digital and analog protocols (e.g., the HART protocol). Some of these protocols operate using relatively simple commands and/or communications (e.g., an ON command and an OFF command as used in the CAN protocol), while other protocols are more complex requiring more commands and/or more communication information, which may or may not include simple commands. For example, more complex protocols may communicate analog values with digital communications superimposed on the analog value using, for example, a Highway Addressable Remote Transducer (HART®) communication protocol. Other field devices can use entirely digital communications (e.g., a FOUNDATION® Fieldbus communication protocol) that provides many types of communications. Other process control communication protocols include the PROFIBUS communication protocol, although still other process control communication protocols have been developed and are being used as well. Each of these communication protocols calls for, or needs to be supported by a particular physical layer, which may include a two-wire, a four wire, etc. physical layer, particular switches, etc. Moreover, the physical layer may specify maximum or minimum wire lengths, wire thicknesses, wire types, termination types, other electrical characteristics, etc.

As a result of the development of these various field device communication protocols, each of which typically uses different communication wiring (physical layers) and signaling formats, various different field devices (e.g., field devices that use the different protocols) are communicatively connected to the process controller via different input/output devices (I/O devices), with each different I/O device conforming to a different one of the process control protocols and supporting a particular type of physical layer. That is, a typical plant may have a controller coupled to multiple different I/O devices including a Fieldbus I/O device (which in turn couples to one or more FOUNDATION Fieldbus field devices via a FOUNDATION Fieldbus compliant two-wire or four-wire bus), a HART I/O device which couples to each of one or more HART compliant field devices via a separate two-wire or four wire single drop connection, a CAN I/O device which couples to one or more CAN compliant field devices via a CAN compliant wiring connection, and so on.

Additionally, coupling the communication ports of field devices to a terminal block of an I/O device and, eventually, to a process controller in the process plant is generally a complex process. Field devices must be coupled to I/O cards that translate the signals received from the field devices to signals that can be processed by the process controllers and that translate the signals received from the controllers to signals that can be processed by the field devices. As a result, each channel of each I/O card, corresponding to a particular field device, must be associated with the appropriate signal types (so that signals are processed appropriately by the I/O card) and the I/O card must be communicatively coupled to the controller or controllers that will eventually be receiving signals from and/or sending signals to the field devices coupled to that I/O card.

As noted above, each field device is coupled to an I/O device using a particular communication medium or physical layer (e.g., a two-wire cable, a wireless link, or an optical fiber) via a terminal block on the I/O device, and further using one of the above or other specialized process control communication protocols (HART, CAN, WirelessHART, FOUNDATION Fieldbus, PROFIBUS, etc.) that have been developed in the process control industry. Still further, the I/O device is separately connected to a process controller, typically via another bus or wired connection. The use of these different I/O devices means that the physical and logical connections between different field devices must be precisely mapped so that the controllers connected to different I/O device can track which field devices are connected to which port of each I/O device in order to communicate signals via the correct "path" to that field device. This problem is especially cumbersome in the HART protocol, in which each field device is connected to a different output port of a HART compliant I/O device.

To alleviate this configuration problem, a hardware configurable I/O device has been developed to be used with, for example, HART field devices and the HART physical layer. The hardware configurable I/O device includes a hardware configurable platform that connects various different HART field devices (and/or 4-20 ma devices that use the same physical layer as HART devices) to a controller. This hardware configurable I/O device includes a removable head-end processor that communicates via a first external bus to one or more process controllers and that communicates, via a second internal bus, to multiple different configurable I/O slots, each of which is connected to and associated with a different termination port (terminal block) of the I/O device. Moreover, each output port or terminal block is configured to be connected to a different field device via, for example, a two-wire or a four-wire HART compliant communication line or physical layer. The hardware configurable I/O device may also include a power supply that supplies power (for HART compliant devices) to each of the I/O slots via the same internal bus or via a second internal bus. Importantly, each I/O slot is adapted to receive a hardware module, referred to herein as an electronic marshalling component (EMC), that when inserted into the slot, connects the module on one side (an input side) with the head-end processor (via the internal communication bus within the I/O device) and the power supply (if present), and that connects the module on the other side (an output side) with one of the output ports or terminal blocks of the I/O device to which a HART compliant field device can be connected. The hardware module or EMC placed into each particular slot of the I/O device includes a processor and a memory that performs communications with the HART compliant field device connected via the output port using the HART communication protocol and this module operates to obtain configuration information and other information from the connected HART field device. The processor of the hardware module also communicates information about the detected HART compliant field device to the head end processor of the I/O device, which uses this information to associate the particular hardware slot of the I/O device with the detected field device. In this manner, insertion of the hardware module (along with operation of the internal processor thereof) enables any HART compliant field device to be coupled to any of the input/output ports of the I/O device and to be automatically detected and configured without the process controller knowing the particular hardware slot/output port to which the field device is connected before the connection actually takes place. Various examples of this hardware configurable I/O device are described in detail in U.S. Pat. Nos. 7,684,875; 8,332,567; 8,762,618; 8,977,851; 9,083,548; and 9,495,313, each of which is expressly incorporated by reference herein.

It is also well known to use a general purpose IP or other packet based communication protocol to perform communications between certain other devices within a process plant. For example, it is common to use a packet based or general purpose IP protocol on an Ethernet bus that communicatively connects one or more distributed process controllers to one or more user interfaces, databases (e.g., configuration databases and historian databases), servers, etc. within a back-end plant environment. As such, Ethernet, which is a physical layer and partly a data link layer, is an important communication platform for automation systems. Importantly, while process control communication protocols such as HART, 4-20 ma, FOUNDATION Fieldbus, CAN and PROFIBUS are currently used by the majority of the installed base to perform communications at the field device level, communication technology utilizing Ethernet is now emerging as a possibility for use in implementing field device communications. Importantly, Ethernet enables flexibility, scalability, and performance in a way not seen before in automation. To help support the adoption of Ethernet in automation, an Advanced Physical Layer (APL) specification is being designed to support the connection of field devices in remote and hazardous locations. Behind APL is the IEEE P802.3cg project which is focused on the development of enhancements to the existing IEEE 802.3 Ethernet standard (IEEE 802.3) for Ethernet via twisted-pair wiring (10BASE-T1L). This development is significant because there is a long list of automation protocols developed for various purposes that can run on top of an Ethernet physical layer.

In support of this emerging Ethernet based communication development in process control, the FieldComm Group has standardized HART-IP as part of the HART 7 release. Although HART-IP was initially designed to allow hosts to efficiently communicate with gateways, it has now emerged as a method for devices to communicate directly with I/O servers and hosts. HART-IP today is already being used in monitoring, control, diagnostics, and condition monitoring applications. Because HART-IP already has available to it a full descriptions of devices, it is a good protocol to layer on top of APL. Moreover, another protocol that is seeing wide-spread support at the device level is OPC Unified Architecture (OPC UA). Although OPC UA does not natively understand device communications and types, considerable effort is underway to provide some level of support in this regard. Although HART-IP and OPC UA are likely to be adopted relatively quickly by the marketplace, they will not be alone in their use. Other protocols, such as EthernetIP and PROFINET are already available on Ethernet and will be able to run on APL when it is available. In addition, IT-driven protocols such as MQTT and AMQP will emerge as important protocols as the Industrial Internet of Things (IIoT) gains acceptance.

Supporting an Ethernet or other advanced physical layer, such as those associated with a packet based or general purpose IP communication protocol, in a process plant that already includes an installed base that relies heavily on more traditional field devices, for example, HART or FOUNDATION Fieldbus field devices, is difficult and not straight forward, as these various communication protocols will need to be synthesized or merged at some place in the process control network via one or more electronic marshalling cabinets or devices. New I/O devices have been developed that provide support for integration of devices operating on an Ethernet or other advanced physical layer. However, challenges remain with respect to the integration of these new, high-speed I/O devices into a process plant that already has an installed base of devices utilizing conventional I/O devices.

SUMMARY

An I/O device is configured to couple a plurality of process control field devices to a process controller controlling a process in an industrial process plant. The I/O device includes a backplane and a plurality of electronic marshalling component (EMC) slots. Each of the EMC slots is configured to receive a respective EMC, and each of the EMC slots is configured to receive either of (i) a first-type EMC associated with a first communication protocol and an associated discrete terminal block by coupling to a first one or more connectors or (ii) second-type EMC associated with a second communication protocol and having an integrated terminal block by coupling to a second one or more connectors. The I/O device also includes one or more I/O processor module slots, each communicatively coupled, via the backplane, to each of the plurality of EMC slots and to each of the first one or more connectors and the second one or more connectors in each of the plurality of EMC slots. The I/O device further includes one or more communication ports, each communicatively coupled to each of the one or more I/O processor module slots via the backplane, and each configured to communicatively couple the each of the one or more I/O processor module slots to the process controller.

DETAILED DESCRIPTION

Figure 1:
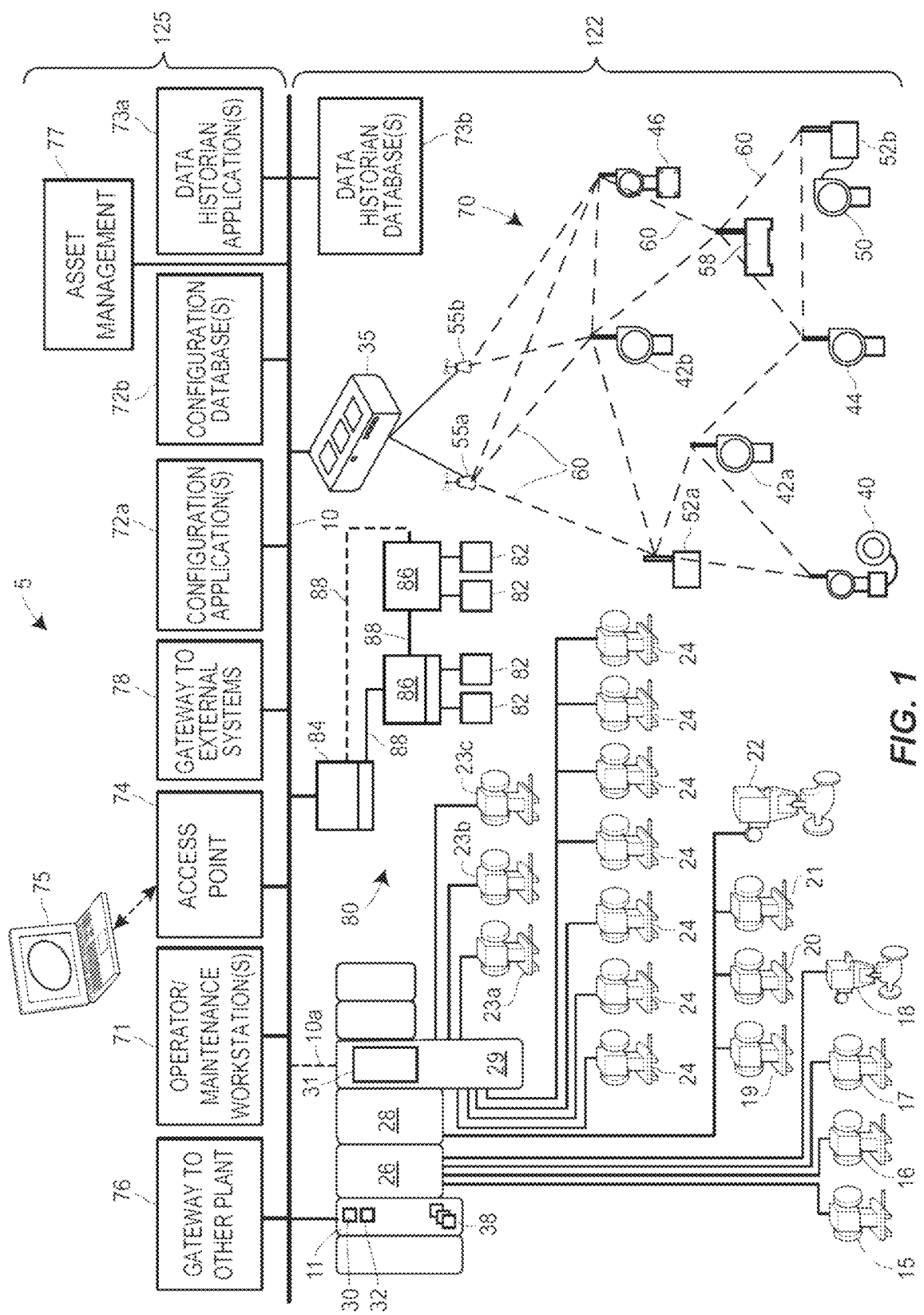
FIG. 1 is a diagram illustrating an example process plant, at least a portion of which implements a mixed physical layer and communications protocol I/O architecture.

FIG. 1 depicts a schematic diagram of an example process plant, process control system, or process control environment 5, that may use a hardware configurable marshaling or I/O device that supports multiple different physical layers and different communication protocols that use those different physical layers in providing communications with field devices in a plant. Generally speaking, the example process plant 5 of FIG. 1 includes one or more process controllers that receive signals indicative of process measurements made by field devices, that process this information to implement a control routine, and that generate control signals that are sent over wired or wireless process control communication links (physical layers) to other field devices to control the operation of a process in the plant 5. Typically, each of the field devices performs a physical function (e.g., opening or closing a valve, increasing or decreasing a temperature, taking a measurement, sensing a condition, etc.) to control the operation of a process. Generally, field devices communicate with process controllers using I/O devices, and the process controllers, field devices, and I/O devices may be wired or wireless. Moreover, any number and combination of wired and wireless process controllers, field devices and I/O devices may be included in the process plant environment 5.

As an example only, FIG. 1 illustrates a process controller 11 that is communicatively connected to wired field devices 15-22 via standard or traditional process control protocol input/output (I/O) cards 26 and 28, and to wired field devices 23 and 24 via an advanced or multi-protocol I/O card 29 which will be referred to herein as a mixed or multiple protocol I/O card or device or a mixed or multiple physical layer I/O device. In this case, the controller 11 is communicatively coupled to the I/O devices 26, 28 and 29 via a backplane bus (not shown) which may implement any desired communication protocol, including any proprietary protocol. In other embodiments, the I/O devices 26, 28, and/or 29 may be communicatively coupled to the controller 11 by another interface, such as an Ethernet interface, either directly or through one or more intermediary I/O devices. The controller 11 is also communicatively connected to wireless field devices 40-46 in a wireless network 70 via a wireless gateway 35 and a process control data highway or backbone 10. The process control data highway 10, which may be implemented as an Ethernet communication structure, may include one or more wired and/or wireless communication links, and may be implemented using any desired or suitable general purpose IP communication protocol such as, for example, an Ethernet protocol. In some configurations (not shown), the controller 11 may be communicatively connected to the wireless gateway 35 using one or more communication networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc. Still further, the controller 11 may be coupled to field devices 82 via a further field device network 80 that uses an advanced physical layer (APL) or other physical layer that supports more traditional internet or packet based communication protocols.

The controller 11, which may be, by way of example, the DeltaV™ controller sold by Emerson Automation Solutions, may operate to implement a batch process or a continuous process using at least some of the field devices 15-24, 40-46 and 82. In addition to being communicatively connected to the process control data highway 10, the controller 11 is communicatively connected to at least some of the field devices 15-24, 40-46 and 82 via the I/O cards 26, 28 and 29 using any desired hardware and software associated with various different communication protocols, for example, a 4-20 mA, the FOUNDATION® Fieldbus protocol, the HART® protocol, the WirelessHART® protocol, etc. In FIG. 1, the controller 11, the field devices 15-24 and 82, and the I/O cards 26, 28 and 29 are wired devices, while the field devices 40-46 are wireless field devices. As will be understood, the wired field devices 15-24 and 82, and the wireless field devices 40-46 can conform to any standard or available communication protocols, such as any wired or wireless protocol, including any standards or protocols developed in the future.

Generally speaking, the process controller 11 of FIG. 1 includes a processor 30 that implements or oversees one or more process control routines 38 (e.g., that are stored in a memory 32). The processor 30 is configured to communicate with the field devices 15-24, 82 and 40-46 and with other nodes communicatively connected to the controller 11. The control routines 38 may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In one example, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may thus include one or more control routines 38 that may implement one or more control loops, which are performed by executing one or more of the function blocks.

The wired field devices 15-24, 82 may be any types of devices, such as sensors, valves, transmitters, positioners, etc., while the I/O cards 26 and 28 may be any known types of I/O devices conforming to any desired communication or controller protocol. In FIG. 1, the field devices 15-18 are illustrated as standard 4-20 mA devices or HART® devices that communicate over analog lines or combined analog and digital lines (the HART or 4-20 physical layer) to the I/O card 26, while the field devices 19-22 are smart devices, such as FOUNDATION® Fieldbus field devices, that communicate over a digital bus to the I/O card 28 using a FOUNDATION® Fieldbus communications protocol and physical layer. In some embodiments, though, at least some of the wired field devices 15, 16 and 18-22 and/or at least some of the I/O cards 26, 28 may alternatively communicate with the controller 11 using other suitable control system protocols (e.g., Profibus, DeviceNet, Foundation Fieldbus, ControlNet, Modbus, HART, etc.)

Moreover, as illustrated in general in FIG. 1, the wired field devices 23 and 24 are communicatively coupled to the I/O device 29 via various different communication lines or buses. In particular, and as will be described in more detail herein, the I/O device 29 includes multiple output ports, pin connectors or terminal blocks, which may each be adapted to accept physical layer hardware (communication lines) associated with different physical layers that support different field device communication protocols (e.g., two-wire, three-wire, four-wire, etc. physical layers). Still further, the I/O device 29 supports communications with different devices connected to the terminal blocks thereof using different communication protocols. In one example, the I/O device 29 may support and be connected to HART compliant physical layers (which may be used to communicate with the HART compliant field devices 23 using the HART communication protocol) and may also support and be connected to one or more other field devices 24 via one or more advanced physical layers, such as an Ethernet bus or wire set, the APL physical layer, etc., and may use a packet based protocol (e.g., an IP protocol, an Ethernet protocol, etc.), for example, to communicate with the field devices 24 over the advanced physical layer hardware. Of course, the field devices 23 and 24 may also be any types of devices, including sensors, valves, transmitters, positioners, etc., and may communicate with the I/O device or I/O card 29 using analog and/or digital signals and using wired or wireless physical layers.

While the I/O device 29 is communicatively connected to the controller 11 via a backplane bus (not shown in FIG. 1), as indicated by the dotted line 10a in FIG. 1, and thus enables the controller 11 to communicate with the field devices connected to the I/O device 29, the I/O device 29 may instead or also be directly connected to the bus or Ethernet connection 10 and communicate directly with applications and other devices (and even devices outside or external to the plant 5) on the bus 10 to provide direct access to the field devices 23, 24 connected to the I/O card 29. As will be described in more detail herein, because some of the field devices 23, 24 connected to the I/O card 29 may include IP addresses and therefore may be addressable via an IP protocol (that is, these field devices may be part of an IIoT system or other monitoring system or otherwise may be reachable via an IP communication protocol), the I/O card 29 can also act as a direct gateway within an asset management system or an IIoT system to the field devices 23, 24, so that these systems do not need to communicate through a controller (such as the controller 11) to obtain information from field devices that support an IP communication protocol.

In the example plant 5 depicted in FIG. 1, the wireless field devices 40-46 communicate via the wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the same wireless protocol or another wireless protocol, for example). To communicate with one or more other nodes that are not configured to communicate wirelessly, the wireless field devices 40-46 may utilize the wireless gateway 35 connected to the process control data highway 10 or to another process control communications network. The wireless gateway 35 provides access to various wireless devices 40-58 of the wireless communication network 70. In particular, the wireless gateway 35 provides communicative coupling between the wireless devices 40-58, the wired devices 11-29, and/or other nodes or devices of the process control plant 5. For example, the wireless gateway 35 may provide communicative coupling by using the process control data highway 10 and/or by using one or more other communications networks of the process plant 5.

Similar to the wired field devices 15-24, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PRO- FIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

Still further, and as will be described in more detail below, the process plant 5 includes an advanced physical layer network 80 that connects the field devices 82 directly to the network bus or backbone 10 using a packet based or IP communication protocol. In particular, the network 80 includes an APL power switch 84 coupled to multiple APL field switches 86 via an APL communication bus or line 88. Generally speaking, the APL power switch 84 includes a power supply that provides power to the APL field switches 86 via the line or bus 88 (which may be set up in a trunk configuration illustrated by the solid line or in a ring configuration illustrated by the solid and dotted lines in the network 80). The field devices 82 communicate with the APL field switches 86 using any desired protocol supported by the APL physical layer (which may be, for example, an Ethernet physical layer or any other physical layer that supports packet based communications, including non-time sensitive or time sensitive networks). Moreover, the field switches 86 communicate using the same protocol and physical layer over the lines 88 to the switch 84, which operates as a gateway to the backbone 10. Additionally, the field switches 86 are connected directly to one or more field devices 82 via spur lines (as defined by the APL physical layer) and communicates with the field devices 82 using the same communication protocol used on the trunk lines 88. The power switch 84 and the field switches 86 operate to communicate packets over the lines 88 between the backbone 10 and the field devices 82. Of course, if desired, the power switch 84 may be coupled directly to a process controller or may be coupled indirectly to a process controller, such as the process controller 11, via the backbone network 10.

Moreover, as illustrated in FIG. 1, the process control system 5 includes one or more operator and/or maintenance workstations 71 that are communicatively connected to the data highway 10. Using the operator or maintenance workstations 71, operators or maintenance personnel may view and monitor run-time operations of the process plant 5, device condition and status information, etc. and may take any diagnostic, corrective, maintenance, and/or other actions that may be required. At least some of the operator or maintenance workstations 71 may be located at various, protected areas in or near the plant 5, and in some situations, at least some of the operator or maintenance workstations 71 may be remotely located, but nonetheless be in communicative connection with the plant 5. Operator and maintenance workstations 71 may be wired or wireless computing devices.

The example process control system 5 also includes a data historian application 73a and a data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71).

In some configurations, the process control system 5 includes one or more gateways 76, 78 to systems that are external to the immediate process control system 5. Typically, such systems are consumers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates a single controller 11 with a finite number of I/O devices 26, 28, 29, field devices 15-24, 40-46 and 82, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-24, 40-46, 35, 52, 55, 58, 70 and 82 via any number of I/O devices 26, 28, 29 to control a process in the plant 5. For example, the process plant 5 may include various physical areas, each having an associated one or more controllers 11 (and associated I/O devices 26, 28, or 29) in communication with an associated set of field devices and networks 15-24, 40-46, 35, 52, 55, 58 and 70 in that physical area.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28 and 29, the field devices 15-24, and other devices and network components 40-46, 35, 52, 55, 58 and 70 are located, disposed, or otherwise included in the field environment 122 of the process plant 5. Generally speaking, raw materials are received and processed in the field environment 122 of the process plant 5 using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator or maintenance workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

While the process plant and process control system are described above with respect to convention process control systems adhering to the Purdue model, it should be understood that the I/O device described in the following paragraphs is equally applicable to and useable with other process control implementations. For example, the I/O device described can be implemented in a process control infrastructure implemented, in part, using a compute fabric, for example as described in U.S. patent application Ser. No. 18/223,384, entitled "Process Control and Automation System Architecture," which was filed on Jul. 18, 2023, the entirety of which is incorporated herein by reference. The compute fabric is a high-performance computing system consisting of loosely coupled storage, resource management, security, networking and parallel processing functions linked by high bandwidth interconnects (such as 10 Gigabit Ethernet), and may include any one or more of a commercial multipurpose platform such as Microsoft's Azure Services platform; platforms owned, operated, and maintained by an enterprise or system provider and dedicated to implementation of process control at one or more enterprises; compute clusters situated on-premises and local to a process plant; etc. The shared resources of the compute fabric, which may be shared among process plants within an enterprise, or by multiple enterprises each operating one or more process plants, does not attempt to follow the well-known, generally followed and accepted Purdue model. That is, the I/O device described herein may serve, in part, as the interface between the field devices coupled to the I/O device via the field wiring, and the compute fabric in which one or more control modules may execute (e.g., as micro-encapsulated execution environments).

Figure 2:
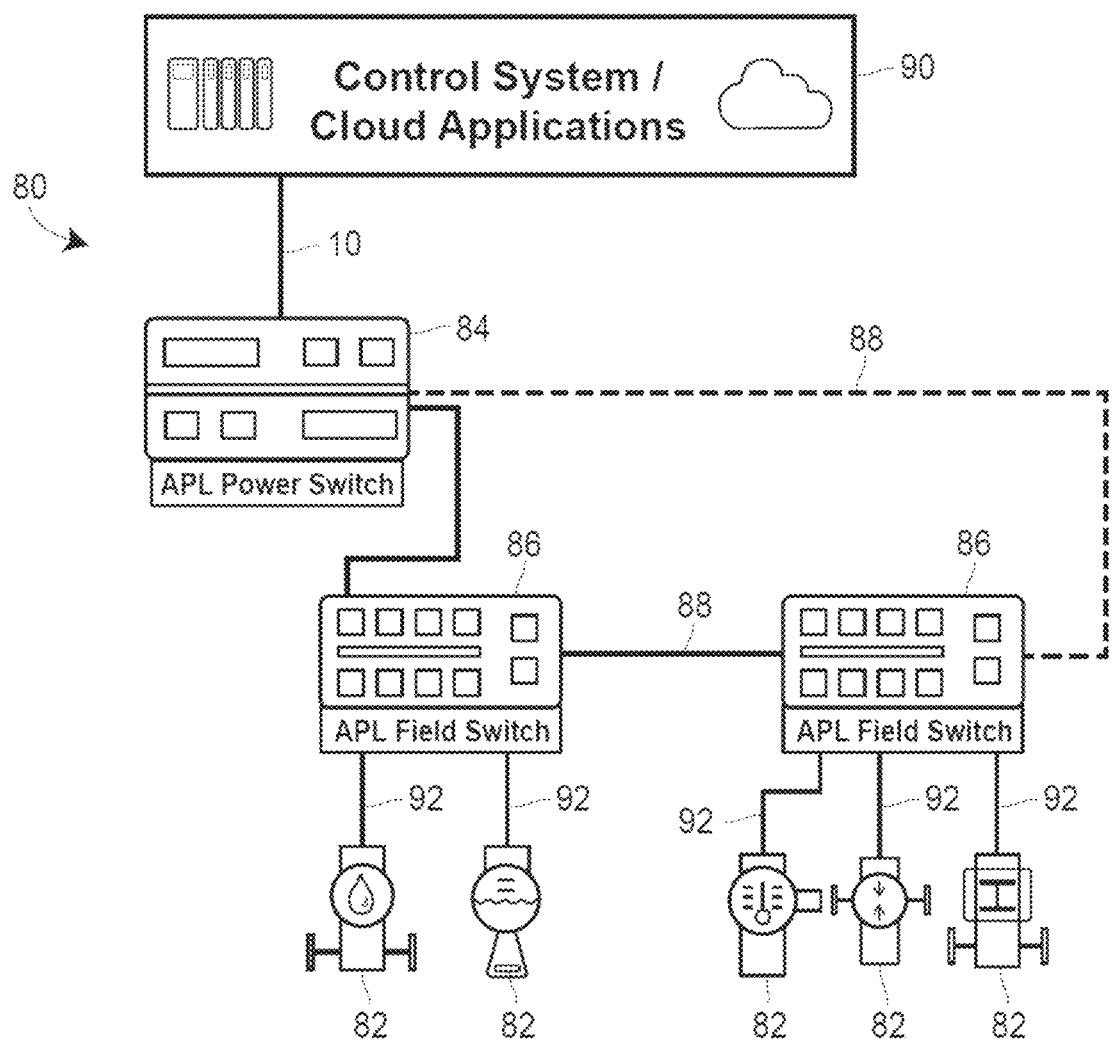
FIG. 2 depicts a diagram of an example advanced physical layer network connected to an Ethernet bus of the plant of FIG. 1 and that is used to support direct IP-based communications with field devices.

In any event, as noted above, the plant environment 5 and, in particular, the field environment 122 of the plant 5 includes support for advanced protocols running on advanced physical layers to perform communications between field devices and the process controllers. As one example of this support, FIG. 2 depicts the advanced physical layer (APL) network 80 of FIG. 1 in more detail. The APL network 80 supports communications between various field devices 82 and the controller 11 using a packet based or an advanced (e.g., general purpose IP-based) communication protocol. In particular, the network 80 includes an APL power switch 84 connected via, for example, an Ethernet or other bus 10, to the control system (e.g., a controller 11 of FIG. 1) and/or to a cloud or other applications 90. The cloud applications 90 may be or may include any or all of the applications and devices 71, 72, 73, 74, 75, 76 of FIG. 1, as well as other devices connected thereto via access points, such as the access point 74. The cloud applications may include simulation applications, control applications, data storage and processing applications, etc. In any event, the APL power switch 84 includes an APL power device that provides power over the APL physical layer, and the APL power switch 84 acts as a gateway to the APL network 80 and, in particular, to various APL field switches 86, which are connected to the APL power switch 84 via a bus or wire network 88 conforming to the APL physical layer standards. As illustrated with respect to FIG. 1, the bus or network 88 may be a trunk line or may be a ring-type connection, as indicated by the dotted portion of the bus 88. In any event, the bus 88 is an APL physical layer including, for example, a two-wire or a four-wire wired network, that provides communication signals as well as power signals from the APL power switch 84 to the APL field switches 86. Moreover, each of the APL field switches 86 has one or any other number of field devices 82 connected thereto via an appropriate APL physical layer or link 92. As an example, the APL links 92 may conform to the APL specification and may be two-wire or four-wire buses, which provides or enables communication signals and power signal to be sent between the APL field switches 86 and the field devices 82.

Of course, the APL power switch 84 acts as a gateway to the bus 10 and operates to multiplex signals from outside sources, such as signals from the backbone bus 10, onto the link 88 using a communication protocol set up for the network 80. Likewise, the power switch 84 may operate to decode messages from any of the field switches 86 (which may be messages from the field devices 82) that are on the link 88 and that are addressed to destinations outside of the network 80 and to send these messages onto the link 10. Likewise, the APL field switches 86 decode messages on the link 88 and, if addressed to one of the field devices 82 connected to the field switch 86, the field switch 86 places the message on the spur line or link 92 to be sent to the field device 82. Likewise, the field switches 86 receive messages from the field devices 82 via the links 92 and place those messages on the link 88 for delivery to another field switch 86 or the power switch 84. Generally speaking, the field devices 82 are all APL compliant field devices in that they use the APL physical layer and a communication protocol that is supported by the APL physical layer (e.g., an IP communication protocol) for communications via the links 92 and 88. The field devices 82 may also receive power via the links 92, and this power is provided from the field switches 86 and is ultimately provided over the bus 88 from the APL power switch 84 and a power supply associated therewith.

In one example, the APL (physical layer) of FIG. 2 may be a ruggedized, two-wire, loop-powered Ethernet physical layer that uses 10BASE-T1L plus extensions for installation within operating conditions and hazardous areas of process plants. In this case, the APL power switch 84 provides connectivity between all standard Ethernet networks and field devices and includes power supplies to provide power to the APL field switches 86 and the field devices 82. Typically, the power switch 84 will be located in the control room or in a junction box on a skid. Likewise, the APL field switches 86 may be designed for installation and operation in hazardous areas. The field switches 86 are loop-powered by the APL power switch 84 and distribute both communication signals and power via spurs 92 to the field devices 82. The Advanced Physical Layer (APL) project was initiated to create a protocol-neutral Ethernet that can solve the problem of finding a long-reach Ethernet protocol. This physical layer can be used as described herein in process automation and on process instrumentation to connect field devices in, for example, remote and hazardous locations and operates to extend the Ethernet physical layer operating at 10 Mb/sec over single-pair cable. Moreover, APL extends 10BASE-T1L for use in hazardous areas which enables the development of standards associated with typical protection methods, especially intrinsic safety.

As such, the network 80 of FIG. 2 can use any communication protocol supported by the APL, such as any protocol supported by an Ethernet connection. These protocols include, but are not limited to, internet protocols (IP protocols), packet-based protocols, time sensitive and non-time sensitive protocols, etc. More particularly, these protocols may include the HART-IP, the OPC UA and any other desired protocols designed for process control communications. Likewise, these protocols may include protocols not traditionally used in process automation, such as general purpose IP protocols, including protocols that support request/response, publish/subscribe, and event-based communications, and data streaming.

The use of the network 80 illustrates one methodology of implementing an APL physical layer and a supported communications protocol within a process control system to provide communications between field devices, such as the field devices 82, and other devices such as process controllers 11 or other devices on the network 10 of FIG. 1. Of course, in other cases, a process controller, such as the process controller 11 of FIG. 1, can be connected directly to the APL power switch 84 in order to provide communications with that power switch using the APL physical layer and to thereby perform communications between the field devices 82 and the controller (e.g., the controller 11) using an APL physical layer. Moreover, while a power supply may be provided in or associated with the APL power switch 84 and may send power to the field switches 86 via the bus 88, the APL field switches 86 may be separately powered or may include their own power supplies or sources and power themselves, as well as the field devices 82, via the APL spur lines 92.

Generally speaking, the network 80 provides an example of a manner of providing a stand-alone APL network within a process control system to provide communications, using a more traditional IP-based communication protocol, between a process controller and field devices. The network 80 may be beneficial when new field devices, that support a more traditional IP-based communication protocol, are newly added to a plant or to an area of a plant. However, it is also possible to integrate an APL physical layer (and an IP communications protocol using that layer) within an existing plant network. More particularly, an overall I/O system may be used within a field environment of a plant to support multiple I/O types while keeping the more traditional I/O architecture of the plant. In general, a new I/O device provides or supports a mixed physical layer which can support multiple different communication protocols, including traditional process control protocols and more common or general-purpose IP-based protocols. Still further, this I/O device provides control at an I/O device processor that leads to improved control, and that supports the combination of control and IIoT applications (which are typically interested in measurement and actuator data), their capabilities, and their diagnostics.

Figure 3:
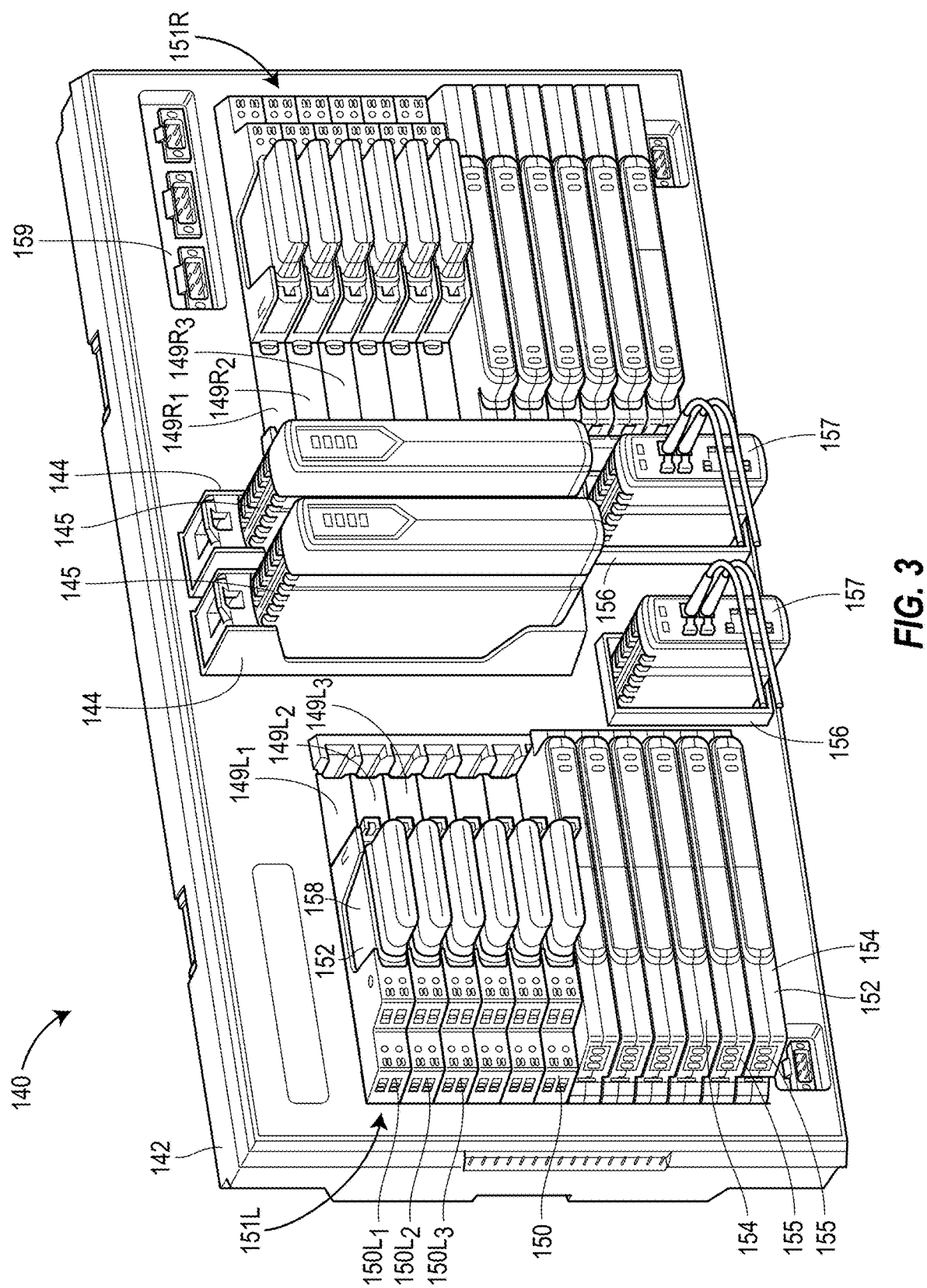
FIG. 3 depicts a hardware configurable I/O or marshalling device that supports communications with field devices using multiple different physical layers and communication protocols.

The I/O device 29 of FIG. 1 is an example I/O device that provides a mixed physical layer and communication protocol platform, and that can be used to provide communications between a process controller and multiple different field devices via various different physical layers and various different communication protocols. FIGS. 3 and 4 illustrate a mixed physical layer and protocol device 140 (which may be the I/O device 29 of FIG. 1) in more detail. More particularly, FIG. 3 depicts a perspective view of an example electronic marshaling or I/O device 140 that supports communications with the multiple different field devices using multiple different physical layers and, if desired, using different communication protocols on the different physical layers. Generally speaking, the I/O device 140 includes an I/O card carrier 142. The I/O card carrier 142 includes slots 144 into which one or more I/O processor modules 145 (also referred to herein as "scanner modules") are placed or are inserted. The I/O card carrier 142 may support multiple different I/O processor modules 145 to which a process controller (e.g., the process control 11 of FIG. 1) may be connected via a wired or wireless connection (e.g., the wired connection coupled to communication ports 157, as described below). In the example of FIG. 3, the I/O card carrier 142 supports two I/O processor modules 145, however, more or fewer I/O processor modules 145 could be supported in (inserted into) the carrier 142. Moreover, the I/O processor modules 145 may be associated with the same or with different communication protocols, may be redundant I/O processor modules that perform the same functionality for one or more different communication protocols, may include a separate I/O processor module for each different communication protocol supported by the I/O device 140, or may include a processor module 145 that supports multiple different communication protocols using different physical layer structure. Still further, one or more of the processor modules 145 may be or may include one or more power supplies for one or more different communication protocols, etc.

As will be understood, the processor modules 145 perform communications with a process controller that is communicatively connected on one side of the I/O device 140 (e.g., the process controller 11 of FIG. 1) via a high-speed data connection (e.g., Ethernet, optical fiber, etc.) and performs communications with various different electronic marshalling components (EMCs) 152 disposed, in respective slots 149 on the I/O card carrier 142, which marshalling components communicate with field devices on the other side of the I/O device 140 (e.g., through field wiring communicatively coupled to the marshalling components). The EMCs 152 may include conventional EMCs 158, as well as high-speed (i.e., having a bandwidth of 10 Mbps or greater, and in embodiments a bandwidth exceeding 25 Mbps, exceeding 100 Mbps, or even up to or exceeding 250 Mbps) EMCs 154, as will be described in greater detail below. Examples of conventional EMCs include, without limitation, EMCs that perform analog input (AI) signal processing via a 4-20 mA communication protocol and physical layer, analog output (AO) signal processing via a 4-20 mA protocol and physical layer, discrete or digital output (DO) signal processing to and from field devices that use, for example, a HART communication protocol and physical layer, discrete or digital input (DI) signal processing to and from such field devices. Examples of high-speed EMCs include, without limitation, EMCs conforming to the advanced physical layer (APL) protocol, EMCs conforming to the Profibus protocol, EMCs conforming to the Foundation Fieldbus protocol, EMCs implementing proportional-integral-derivative (PID) control, EMCs performing Ethernet (Cat 5 or fiber optic) communication, EMCs performing Bluetooth communication, EMCs performing WiFi communication, EMCs performing LoRaWan communication, etc. The I/O processor modules 145 may include specialized or general purpose processors and memories, that are programmed to perform various communication functions including receiving and sending communication signals to the process controller, decoding and coding signals received from and sent to field devices using one or more communication protocols, responding to messages from field devices and the process controller using the appropriate communication protocol to communicate information and messages from the controller to the field devices and vice-versa, tracking the identity of and the logical location of field devices coupled to the I/O device (i.e., determining, tracking and storing communication paths and communication protocols that are used to communicate with the field devices connected to the I/O device, filtering messages so that only traffic intended for field devices connected—via the EMCs 152—to the I/O device 140 make it onto the backplane and vice versa), etc. The I/O processor modules 145 may also, in some cases, include a power supply or connect to an external power supply and supply power, directly or via one or more EMCs 152, over one or more field device communication networks connected to the I/O device 140.

The slots 149 (the EMC slots) electrically and communicatively connect to the slots 144 (the I/O processor module slots) (and, therefore, to the processor modules 145) via one or more internal buses (not shown in FIG. 3) on a backplane (not shown in FIG. 3). As FIG. 3 depicts, in an embodiment, the plurality of EMC slots 149 are grouped into a left array 151L and a right array 151R. Each of arrays 151L, 151R supports a plurality of individually configurable channels, wherein each channel includes a dedicated slot $149L_1$, $149L_2$, $149R_1$, $149R_2$, etc. As will be described in greater detail below, each of the slots $149L_1$, $149L_2$, $149R_1$, $149R_2$, etc. includes a variety of connectors and, in particular, includes a first connector (e.g., one or more pin- or blade-type connectors) configured to be coupled to a dedicated wire terminal block $150L_1$, $150L_2$, $150R_1$, $150R_2$, etc. that can be disposed in the slots $149L_1$, $149L_2$, $149R_1$, $149R_2$, etc. Each terminal block 150 includes wire termination points, connectors or other attachment hardware of any desired type to connect the terminal block 150 to one or more field devices, and each terminal block 150 may be configured to receive or to connect to wires or physical layer hardware associated with any of various different physical layers called for by different communication protocols. In some cases, each terminal block 150 may be configured to accept wiring or physical layer structure associated with multiple different types of physical layers. As a result, each termination block 150 may include screw wire connectors, spring loaded wire connectors, etc. for each of two, three, four, etc. wires that may be used for or that are compliant with various different types of physical layers (which in turn, support any of various different communication protocols or I/O channel types). As an example only, each terminal block 150 may include a set of wire connectors that may accept and connect wires associated with one or more of a HART physical layer, a FOUNDATION Fieldbus physical layer, an Ethernet physical layer, an APL physical layer, or any other desired physical layer.

Likewise, each of the slots 149 is adapted or configured such that the terminal block 150, which itself is configured to receive a removable electronic marshaling component (EMC) 152, can facilitate communication between the EMC slot 149 (and therefore the EMC 152) and the processor module slots 144 (and therefore the processor modules 145). Thus, each of the slots 149 includes a second connector (e.g., a pin-type connector) configured to be coupled, when the EMC 152 is seated in the terminal block 150, to the EMC 152 installed in the terminal block 150. While in some described embodiments, both conventional EMCs 158 and high-speed/APL EMCs 154, utilize the second connector, and are seated in the terminal block 150, in the embodiment depicted in FIG. 3, only conventional EMCs 158 utilize the second connector and are seated in the terminal block 150.

In embodiments, each of the slots 149 additionally includes a third connector (e.g., a card-slot type connector) configured to be coupled to an EMC 152. The third connector may facilitate higher data-rate communication protocols and, as such, may accommodate higher-speed electronic marshaling components that cannot be accommodated using conventional EMC terminal blocks (e.g., the terminal blocks 150). Thus, while in some embodiments of the contemplated I/O device conventional EMC modules 158 and high-speed/APL EMC modules 154 may each be installed in a terminal block disposed in one of the slots 149, in the embodiment depicted in FIG. 3, conventional EMC modules 158 can be accommodated by associated terminal blocks 150 installed in the slots 149, while high-speed/APM EMC modules 154 that do not have associated discrete terminal blocks 150 (but instead have integrated terminal blocks 155) are installed directly into the slots 149. These arrangements will be described in further detail below.

In any event, a different EMC 152 may be removably inserted into each different slot 149A, 149B, etc. and, when inserted into a slot 149, may be securely received and electronically connected to the terminal block 150 associated with the particular slot 149 and/or may be securely received and electronically connected directly to the particular slot 149, depending on the type of EMC 152 being inserted, with each of the slots 149 being able to accommodate both high-speed/APL EMCs 154 and conventional EMCs 158. While not explicitly shown in FIG. 3, each slot 149 is also connected via one or more internal buses on a backplane (not depicted in FIG. 3) to the I/O processor modules 145 to enable the I/O processor modules 145 to communicate with each of the EMCs 152 inserted into any of the slots 149. Each EMC 152 also includes a processor and a memory, wherein the processor may be a general purpose processor or a specific processor (e.g., implemented as an ASIC or some other specialized hardware or firmware processor), and is programmed to perform communication functions with one or more field devices connected to the EMCs 152 (e.g., via a terminal block 150) using a particular communication protocol and physical layer. The processor of each EMC 152 may detect one or more field devices connected to the associated terminal block, poll the field device(s) for specific device information using a particular communication protocol, including for example, device identity and configuration information, may store this information in a local memory on the EMC 152 and may communicate this information, as well as device communication path information to the processor module 145. Still further, the processor of each EMC 152 may be programmed to configure and send messages from the processor module 145 to one or more field devices connected to the EMC 152 using a particular communication protocol and to receive and decode (if necessary) messages from the one or more field devices connected to the EMC 152 and to pass these messages to the processor module 145 for processing and communication to the process controller, if needed.

In embodiments, the EMC slots 149 of the I/O device carrier 142 can accommodate not only a combination of conventional EMCs 158 and high-speed/APL EMCs 154, but can also accommodate a combination of different kinds of high-speed EMCs 154 (e.g., one or more APL EMCs and one or more Profibus EMCs).

The I/O device 140 also includes one or more communication ports 157, disposed in associated slots 156, for forming the communication link between the I/O device 140 and the process controllers 11, either directly or through one or more intermediary devices such as an I/O network. FIG. 3 depicts two communication ports 157, though in other embodiments more or fewer communication links may be present. The communication ports 157 may be any type of communication port (e.g., optical fiber, Ethernet/Cat-6, Ethernet/Cat-5, 100 Gbps, etc.) configured and adapted to support the communication bandwidths of the installed EMCs 152. In a particular embodiment, the communication ports 157 support optical-fiber connections to accommodate the high-speed APL EMCs that may be installed. In some embodiments, such as that depicted in FIG. 3, the communication ports support multiple physical communication media. The communication ports 157 depicted in FIG. 3 support both Ethernet and optical fiber physical media.

One or more power connectors 159 may receive electrical power for the I/O device 140. As will be understood, in embodiments a single power connector 159 may receive power at a first voltage to power an on-board power supply (not shown) that provides power to one or more different voltages to power the processor modules 145, the communication ports 157, conventional EMCs 158, high-speed/APL EMCs 154, and/or the field devices coupled to and powered by the EMCs 152. In other embodiments, multiple power connectors 159 may each receive power at various voltages to provide the power to the processor modules 145, the communication ports 157, conventional EMCs 158, high-speed/APL EMCs 154, and/or the field devices coupled to and powered by the EMCs 152. In some embodiments, there may be multiple power connectors 159 receiving power from redundant sources to ensure that the process is not adversely affected in the event that one power source fails.

In embodiments such as that depicted in FIG. 3, the left and right arrays 151L and 151R of slots 149 are disposed to either side of the I/O processor slots 144 and the I/O processor modules 145 disposed within them. Contrary to previous I/O devices, this arrangement removes the EMC modules 152 from the convective airflow path of the I/O processor modules 145 and avoids preheating the air that would otherwise cool the I/O processor modules 145. Similarly, in embodiments, the communication ports 157, while disposed below the I/O processor modules 145, may be disposed outboard (i.e., to the left and right) of the pair of I/O processor modules 145, which further facilitates free convective airflow around the I/O processor modules 145 and reduces preheating of the air cooling the I/O processor modules 145.

While FIG. 3 depicts the top of each of the left and right arrays 151L, 151R of slots 149 as having installed therein conventional EMCs 158 in terminal blocks 150, and depicts the bottom of each of the left and right arrays 151L, 151R of slots 149 as having installed therein high-speed/APL EMCs 154, it should be understood that in all of the contemplated embodiments, each of the slots 149 is operable to receive either type of EMC 158, 154.

Figure 4A:
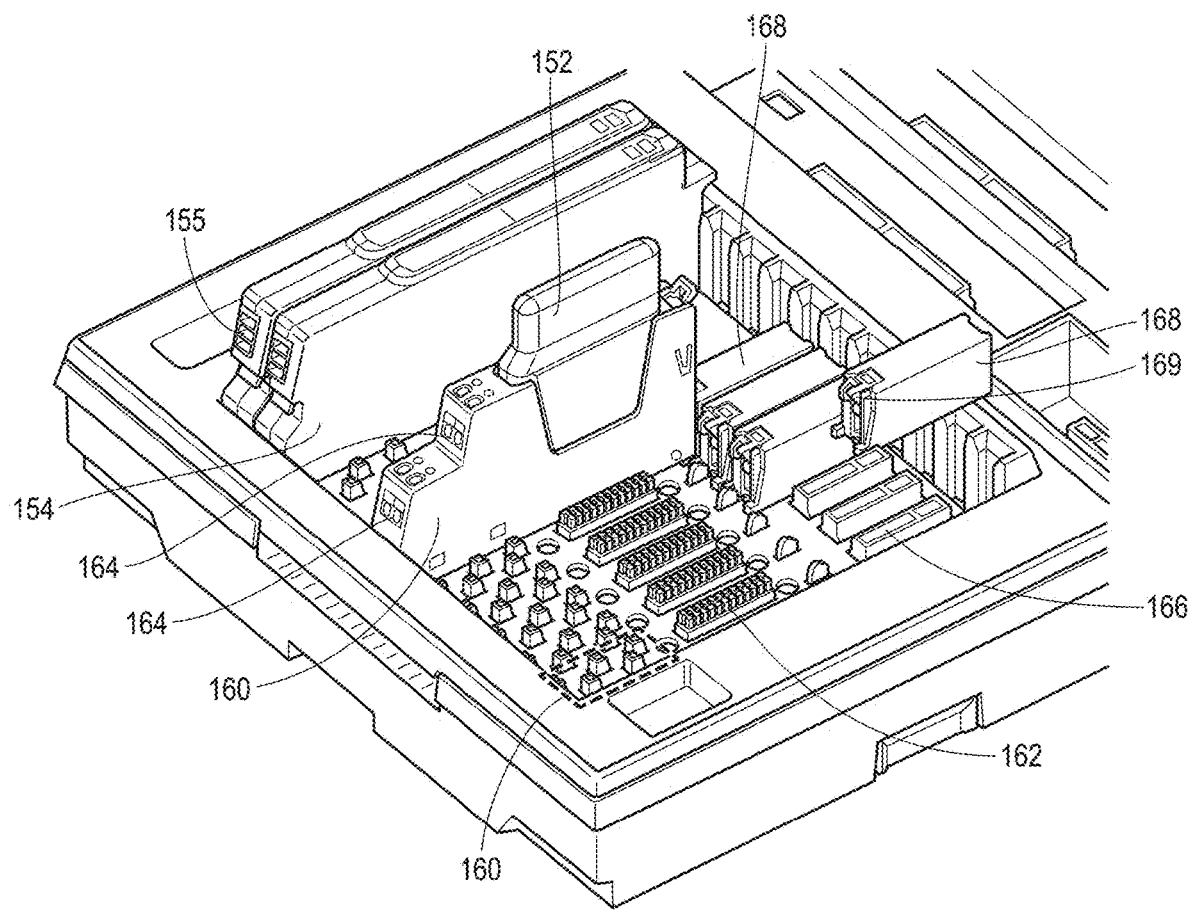
FIG. 4A depicts an embodiment of the structural and connector arrangement in a plurality of slots configured to receive electronic marshaling components supporting different physical layers and communication protocols.
Figure 4B:
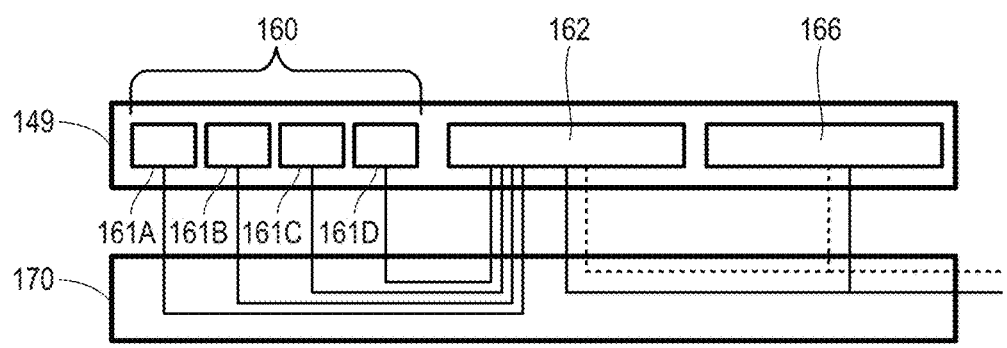
FIG. 4B depicts the wiring between the connectors and backplane in the embodiment depicted in FIG. 4A.

FIGS. 4A and 4B illustrate, respectively, a partial mechanical diagram and partial electrical schematic diagram of the I/O device 140 of FIG. 3 to illustrate the connectors that are disposed within the EMC slots 149 and the electrical connections between the connectors. In particular, the slots 144 accept I/O processor modules 145. A first set of connectors 160 and a second set of connectors 162 disposed in each EMC slot 149 are configured to physically and electrically couple to a conventional EMC 158 via a corresponding terminal block 150. The first set of connectors 160 (which may be, for example, blade connectors 161A-161D) couples field wiring terminals 164 on the terminal block 150 to a conventional EMC 158 through a backplane 170 and the second connectors 162 (which may be, for example, pin-type connectors). The second set of connectors 162 also couple the EMC 158 to the I/O processor modules 145, again, via the backplane 170. That is, with reference to FIG. 4B, field wiring to the field devices is terminated at the terminals 164 of the terminal block 150. The terminals 164 are electrically coupled to the first set of connectors 160, which are electrically coupled to the second set of connectors 162 via the backplane 170. The second set of connectors 162 is electrically coupled to the EMC 158 seated in the terminal block 150. Signals from the EMC 158 to the I/O processor modules 145 are communicated through the second set of connectors 162 and the backplane 170.

Meanwhile, a third set of connectors 166, which may be, for example, a card-edge connector, disposed in each EMC slot 149, is configured to electrically and physically couple to a high-speed/APL EMC 154. In the embodiment depicted in FIGS. 3 and 4A, the high-speed/APL EMC 154 includes an integrated terminal block 155, to which field wiring, coupled to the field devices, is terminated using, for example, spring- or screw-type connectors. Power for the components of the high-speed/APL EMC 154, in addition to data signals to and from the field wiring are communicatively coupled to the internal processor and other components (not shown) of the high-speed/APL EMC 154 internally to the EMC 154, without passing through the backplane 170.

Because the EMCs 152 each communicate through the backplane 170 with the I/O processor modules 145, and because the data and power signals transmitted between the EMCs 152 and the I/O processor modules 145 are the same types of signals regardless of whether the EMC 152 is a conventional EMC 158 or a high-speed/APL EMC 154, corresponding pins of the second set of connectors 162 and the third set of connectors 166 are communicatively coupled via the backplane 170, in addition to being communicatively coupled to the I/O processor modules 145 (i.e., via the I/O processor module slots 144).

As can be understood in view of FIG. 4A, the EMC slots 149 are configured, in embodiments, such that the conventional EMCs 158 and, in particular, the terminal blocks 150 in which the conventional EMCs 158 are seated, do not extend the entire length of the slots 149. Specifically, the terminal blocks 150 do not extend to the third set of connectors 166 and, when the terminal block 150 is seated in the slot 149, the third set of connectors 166 remains exposed. In embodiments, a cover 168 is provided to fit over the third set of connectors 166 and, in embodiments, to provide a seating or latching mechanism 169 configured to engage the terminal block 150. At the same time, the high-speed/APL EMCs 154, when installed in the EMC slots 149, are configured in embodiments such as those depicted in FIGS. 3 and 4A, to extend the entire length of the EMC slot 149 and to cover, but not physically or electrically engage, the first and second sets of connectors 160, 162.

Figure 4C:
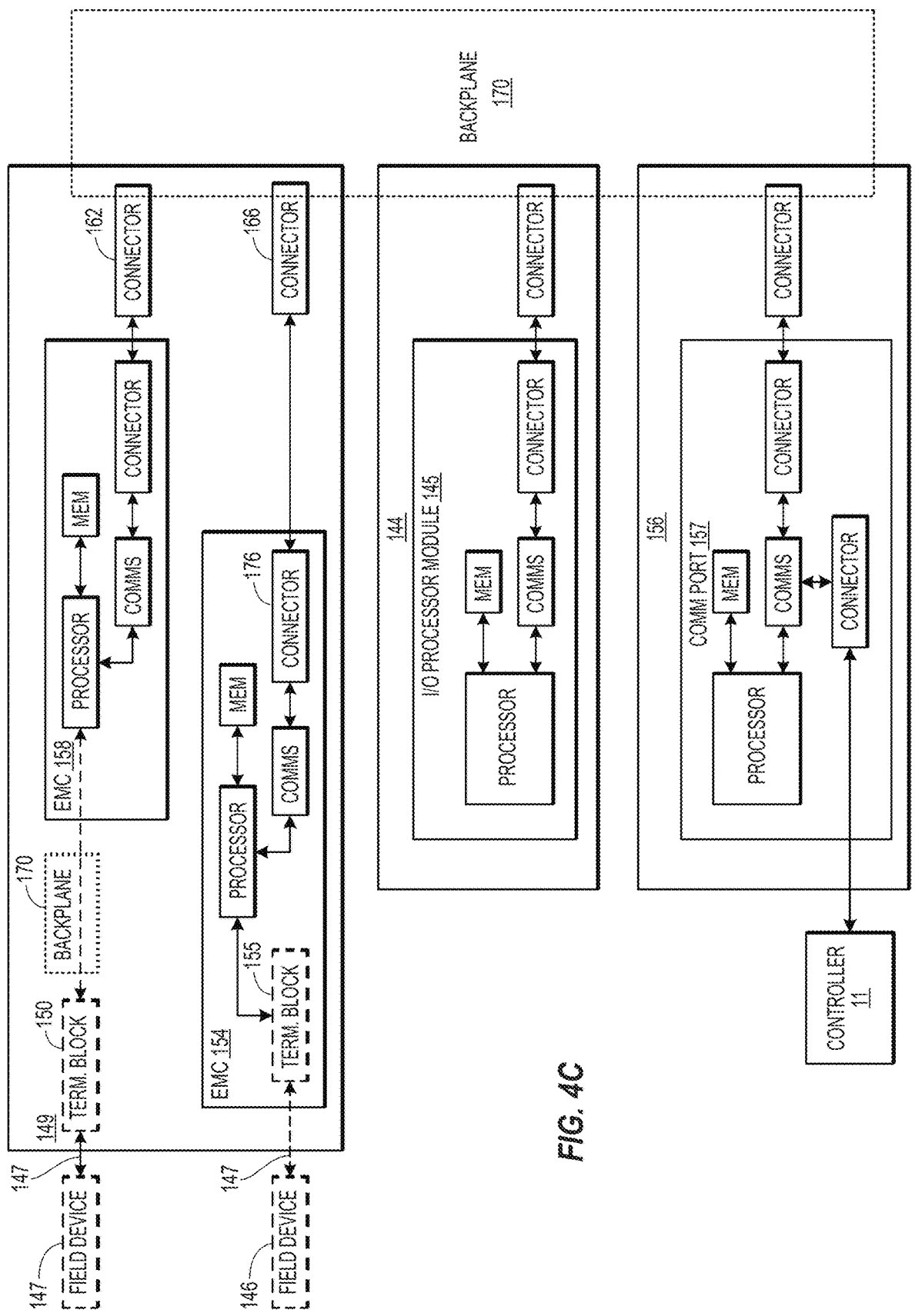
FIG. 4C is a block diagram illustrating the connections between the various components in the embodiment of FIG. 4A.

FIG. 4C is a block diagram illustrating the various components and communication flows for each type of EMC 152. (Of course, while FIG. 4C depicts both a conventional EMC 158 and a high-speed/APL EMC 154 in the EMC slot 149, it should be understood that only one EMC can populate a given slot 149 at any time.) As shown in FIG. 4C, when the EMC slot 149 is populated with a conventional EMC 158, a field device 146 is coupled by field wiring 147 to a terminal block 150 (seated in the slot 149 but external to the conventional EMC 158), which carries signals, via the backplane 170, to the EMC 158. When the EMC slot 149 is populated with a high-speed/APL EMC 154, the field device 146 is coupled by the field wiring 147 to a terminal block 155, integrated within the EMC 154 as described previously. In either case, the EMC 158, 154 communicates, via the connector (162 or 166, respectively) through the backplane 170, to a connector of the I/O processor module slot 144, and therethrough, with the I/O processor module 145. The I/O processor module 145 communicates, via the connector and the backplane 170, with the communication port 157 via a connector in the communication port slot 156 and, in turn, with the controller 11 (directly or through one or more intermediary devices such as an I/O network). As illustrated in FIG. 4C, each of the EMC 152, the I/O processor module 145, and the communication port 157 includes a processor, a memory, and necessary communication circuitry.

Figure 5A:
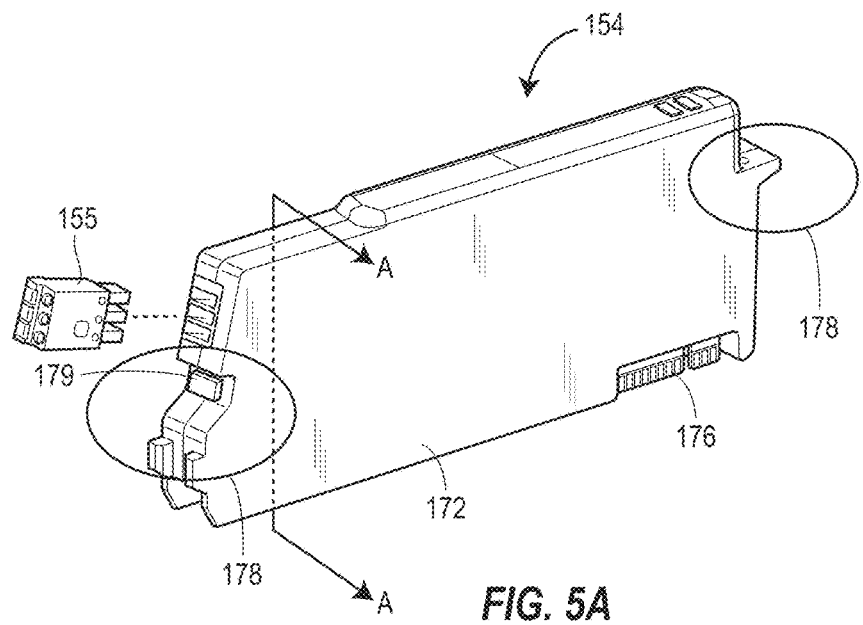
FIGS. 5A-5C are varying perspective views of a high-speed or advanced physical layer electronic marshaling component configured to operate with the I/O device embodiment of FIG. 3.
Figure 5B:
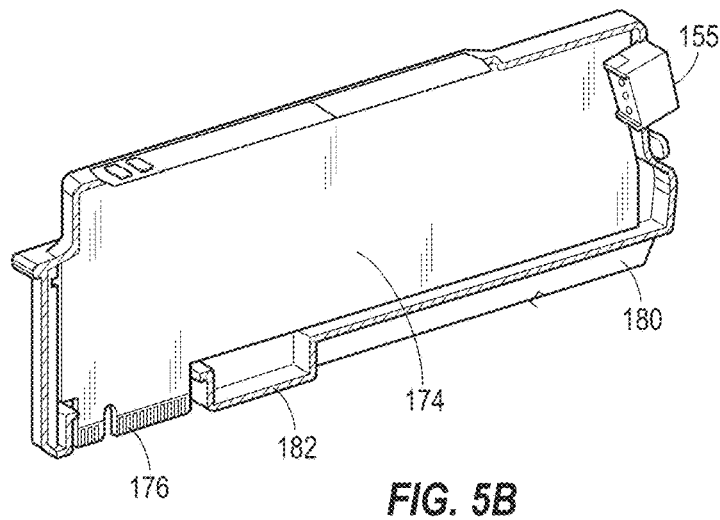
Figure 5C:
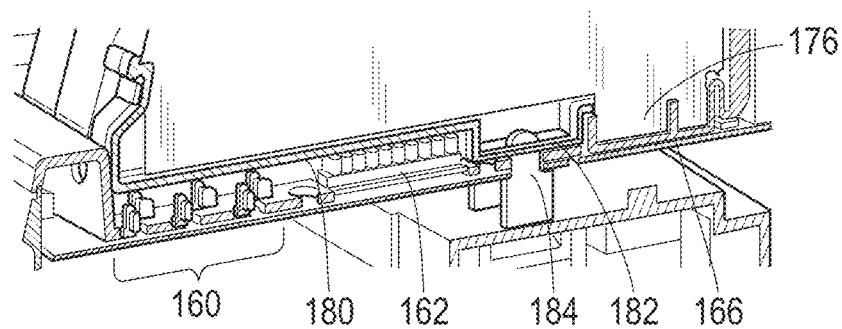

FIGS. 5A-5C illustrate the high-speed/APL EMC 154 of these embodiments in additional detail. FIG. 5A shows a perspective, partially exploded view of the EMC 154. The EMC 154 includes a body 172 that encloses a printed circuit board 174 (FIG. 5B) (carrying a processor, a memory, and other electronics, as will be understood) having an associated connector 176 (e.g., a card-edge connector) configured to couple to the third set of connectors 166 disposed in the EMC slots 149. As can be discerned in FIGS. 5A and 5B, the connector 176 extends through the body 172 at a position configured to couple to the third set of connectors 166. In FIG. 5A, the integrated terminal block 155 is depicted separately in the partially exploded view. Grip and latch geometry 178, including a release button 179 facilitate the insertion and removal of the EMC 154 which, in embodiments, occurs by linearly translating/inserting the EMC 154 into the slot 149. (This is in contrast with conventional EMCs, which are inserted by seating one side of the terminal block 150 and pivoting the other side into place.) FIG. 5B depicts a cross-sectional view of the EMC 154 taken across section A-A of FIG. 5A. FIG. 5C depicts the cross-sectional view of FIG. 5B seated in a corresponding cross section of a slot 149. In FIGS. 5B and 5C, it can be observed that a channel 180 on the underside of the EMC 154 is configured to provide a clearance zone such that the EMC 154 engages neither physically nor electrically with the first and second sets of connectors 160, 162 and, in fact, may include a plastic (or other insulative material) barrier that prevents arcing in case high voltages are present on the backplane 170 for other EMC slots 149. A guidance feature 182 may be configured to engage with a corresponding guidance feature 184 (see FIG. 5C) (e.g., a post) disposed in the EMC slot 149 ensure proper alignment of the connector 166 and the connector 176.

Figure 6:
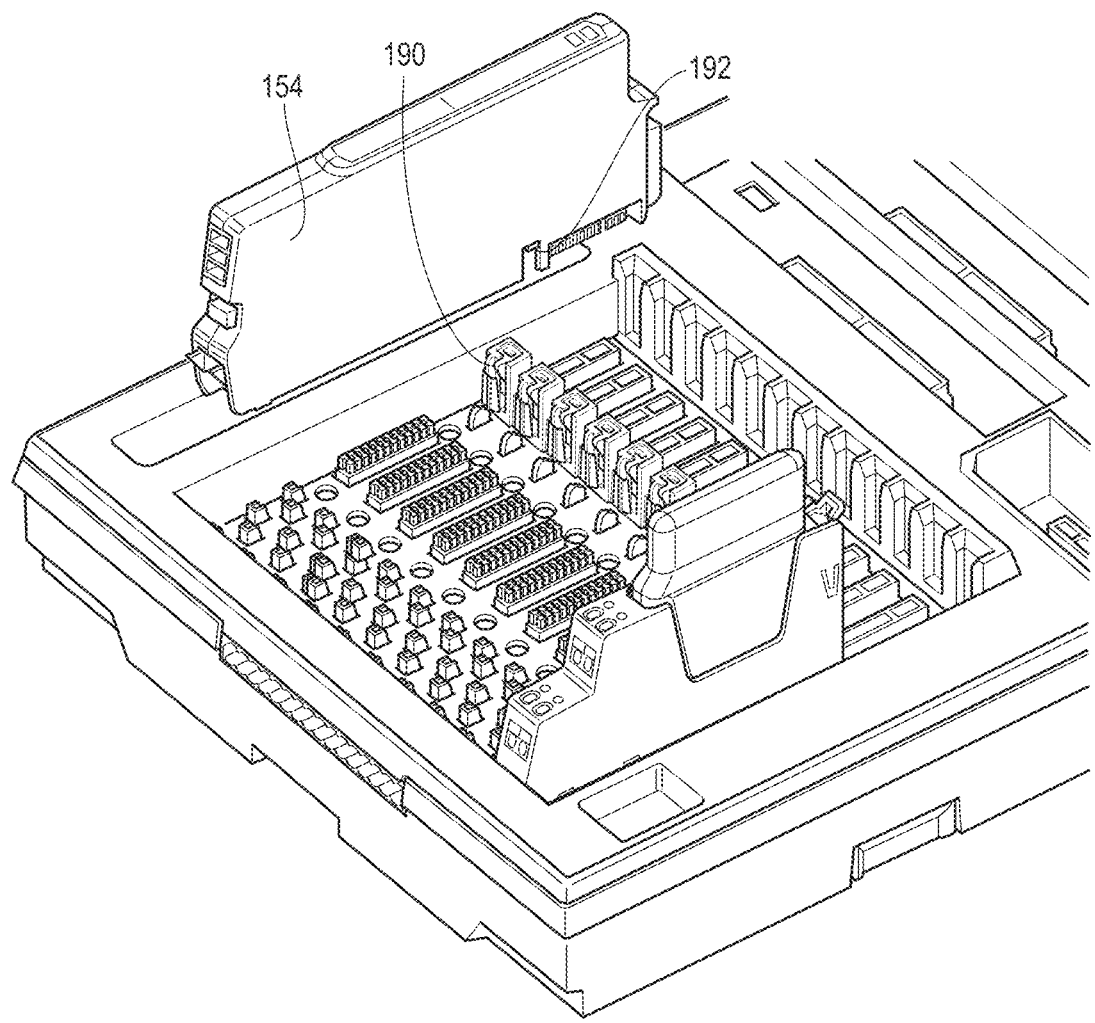
FIG. 6 illustrates an alternate embodiment of the structural and connector arrangement in a plurality of slots configured to receive electronic marshaling components supporting different physical layers and communication protocols.

In alternate embodiments, each of the EMC slots 149 includes, between the connectors 162 for the conventional EMCs 158 and the connectors 166 for the high-speed/APL EMCs 154, a seating and/or latching structure 190. The seating and/or latching structure 190 could serve to guide and/or secure one edge of the terminal block 150 in the slot 149. This has the advantage of removing the seating/latching functionality from the cover 168 (rendering the cover 168 merely that, a cover for protecting the connector 166), and fixing the seating/latching functionality to a structure (the structure 190) that is integrated into the I/O card carrier 142 and, in particular, the EMC slot 149. The structure 190 could, in embodiments, also provide seating/latching of the high-speed/APL EMCs 154, by incorporating in the high-speed/APL EMCs 154 a corresponding structure 192, as depicted in FIG. 6.

Figure 7A:
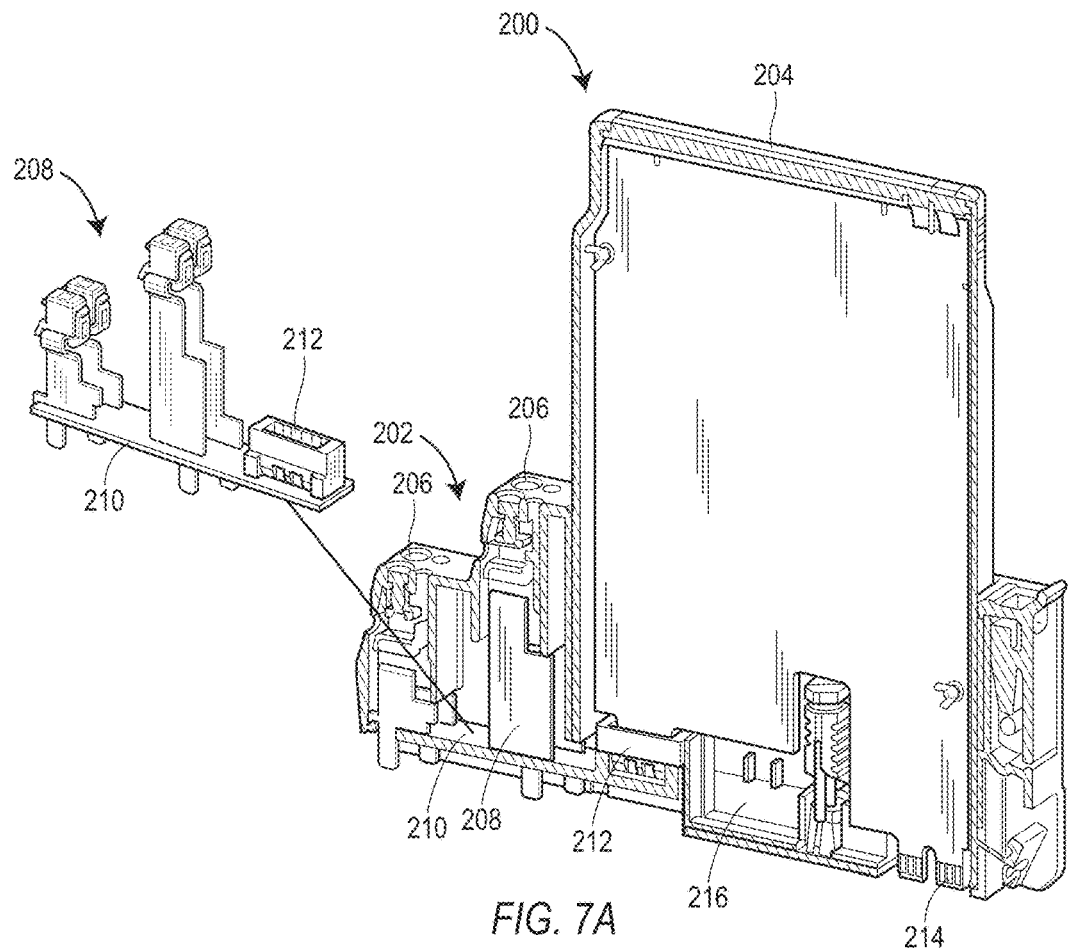
FIGS. 7A-7C are varying perspective views of an alternate embodiment of a high-speed or advanced physical layer electronic marshaling component.
Figure 7B:
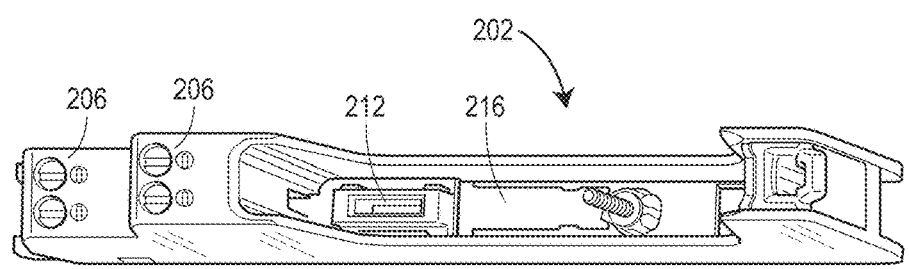
Figure 7C:
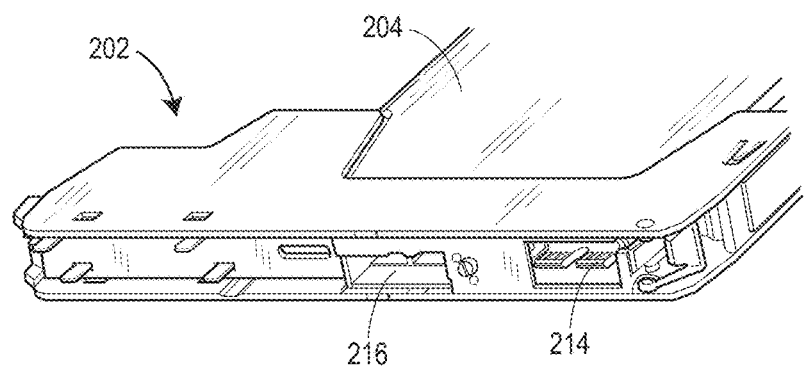

FIGS. 7A-7C depict perspective views of an alternate embodiment 200 of a high-speed/APL EMC of the I/O device 140. The high-speed/APL EMC assembly 200 depicted in FIGS. 7A-7C maintains the two-piece—terminal block and EMC—arrangement of the conventional EMCs 158. In the assembly 200, a terminal block 202 is configured for use specifically with a discrete high-speed/APL EMC 204. Like the terminal block 150, the terminal block 202 includes terminals 206 to which field wiring is terminated. Specifically, the field wiring is terminated to a new termination assembly 208, depicted in FIG. 7A both as a separate component (for ease of understanding only) and integrated into the terminal block 202. The termination assembly 208 includes blade connectors similar to those of the terminal block 150 that receives conventional EMCs 158, however, in contrast, the termination assembly 208 includes a PCB 210 that provides electrical connectivity between the terminals 206 and a connector 212 that couples to the EMC 204, rather than communicating the signals between the terminals 216 and the EMC 205 through the backplane. The blade connectors of the terminal block 202 function as physical, but not electrical connection, to the backplane. The connector 202 is disposed, within the terminal block 202, in a space that, in the terminal block 150, would be between the connectors on the terminal block 150 that cooperate with the first and second sets of connectors 160, 162 of the I/O card carrier 142. In the assembly 200, the third set of connectors—the card connectors that electrically couple the high-speed/APL EMC 204 to the backplane 170—are disposed within the footprint of the conventional terminal block 150. Connectors 214 on the EMC 204, and corresponding connectors on the I/O card carrier, would be situated, with reference to the I/O card carrier 142 in FIG. 4A, within the space between the connectors 162 for the conventional EMCs 158 and the connectors 166 for the high-speed/APL EMCs 154. An opening 216 in the assembly 200 would accommodate the second set of connectors 162 without physically or electrically engaging the connectors 162. This embodiment has the advantage of having a smaller footprint than that of the I/O device 140, because each of the EMC slots 149 can be the same size as the slots in conventional devices that carried the conventional terminal blocks 150. With reference to FIGS. 7A-7C, one can determine the corresponding arrangement of features in an I/O card carrier associated with these embodiments.

Figure 8A:
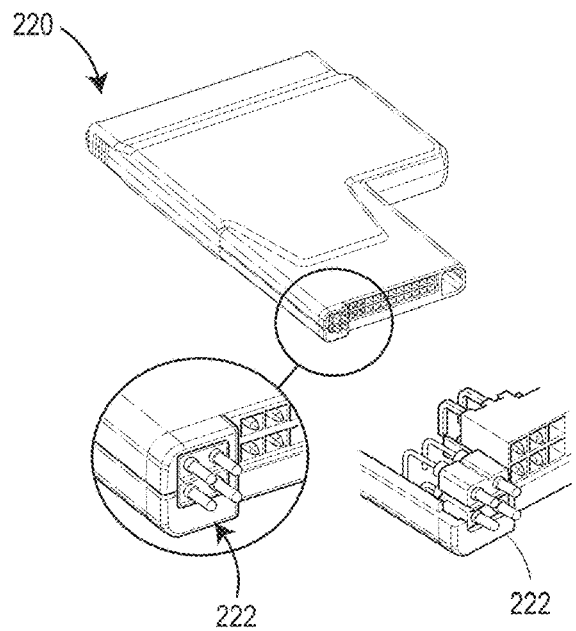
FIGS. 8A and 8B illustrate yet another embodiment of a high-speed or advanced physical layer electronic marshaling component.
Figure 8B:
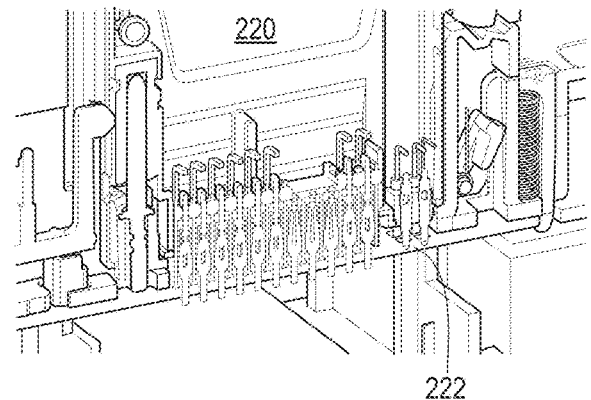

Turning now to FIGS. 8A and 8B, a further embodiment of a high-speed/APL EMC 220 is depicted. The high-speed/APL EMC 220 has essentially the same form factor as the conventional EMC 158, and, as a result fits into the terminal blocks 150 used with the conventional EMCs 158. The high-speed/APL EMC 220 differs from conventional EMCs 158 in that an additional set of pin-type connectors 222 communicatively couples the field wiring signals to the high-speed/APL EMC 220, while signals between the high-speed/APL EMC 220 and the I/O processor modules 145 are communicated through the conventional-type connector 162 also used with conventional EMCs 158. The additional set of pin-type connectors 222 replaces a keying feature used in prior art I/O devices. Advantageously, this configuration allows both conventional EMCs 158 and high-speed/APL EMCs 154 to be used with the terminal blocks 150 and, as a result, to have EMC slots 149 that are the same size as those of prior art I/O devices. Additionally, in embodiments using this configuration, the additional connectors on the I/O card carrier 142 can be eliminated in favor of contact pads to which the pins couple electrically. In embodiments, the pin-type connectors 222 are so-called "pogo" pins (pins that are spring-loaded to maintain contact with the pads to which they couple).

Figure 9:
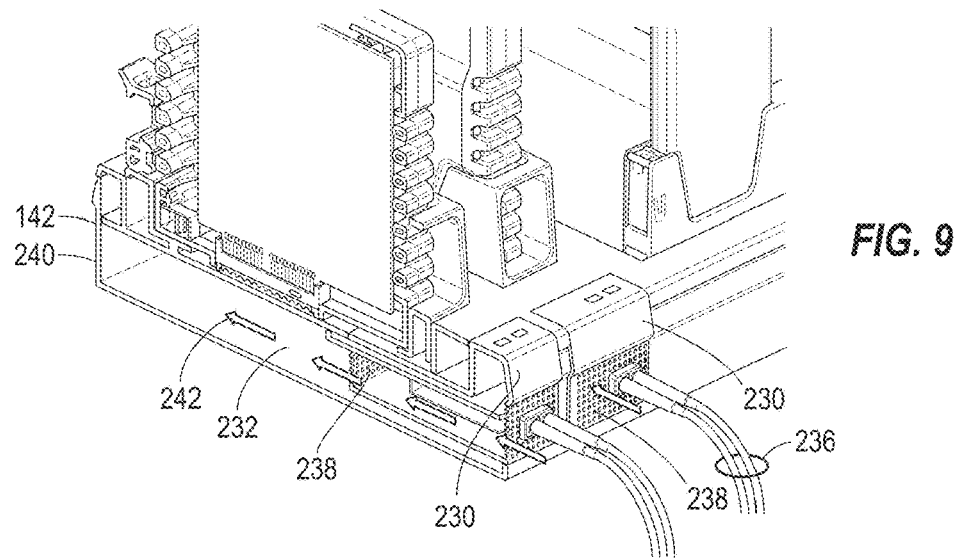
FIG. 9 is a perspective view of an alternate embodiment of the I/O device having an internal communication port configuration.

In still another variation, the I/O card carrier 142 may integrate into I/O card carrier 142 the communication ports 157, as depicted in FIG. 9. While in other embodiments, the communication ports 157 are disposed in slots 156 on the face of the I/O card carrier 142, in embodiments such as that depicted in FIG. 9, hardware modules 230 associated with the communication ports 157 is instead internal to the I/O card carrier 142, sitting in a hollow space 232 behind a face 234 of the I/O card carrier 142, with physical media 236 coupled to modules 230 extending into the bottom of the I/O card carrier 142. Perforations 238, 240 in the modules 230 and in the I/O card carrier 142 facilitate a path 242 for convective airflow to cool the modules 230 without preheating the air that cools hardware seated in the slots 144 and 149 on the front face of the I/O card carrier 142. Advantageously, this configuration may also alleviate interference of the connections with an enclosure door and/or prevent an enclosure door from causing the connections to be bent further than their minimum bend radius.

In addition to having in common that each of the slots 149 on the I/O card carrier 142 can accommodate either conventional EMCs 158 or high-speed/APL EMCs 154, the I/O devices according to the present disclosure have in common a variety of features related to the backplane 170 and communication over the backplane 170 between the EMCs 152 and the I/O processor modules 145. In pure Ethernet signaling, redundancy is accomplished by modifying the Ethernet data at each hop of the message—adding and/or modifying addresses, adding and/or modifying redundancy/error correction codes, and the like. Backplanes on devices such as (i.e., similar to, but not) the described and contemplated embodiments frequently utilize Ethernet switches to move data between different devices (marshaling components, I/O processor modules, etc.) coupled to the backplane. Such Ethernet switches represent a major, single point of failure in such implementations.

In contrast to other backplanes that implement "pure" Ethernet signaling between devices communicating over the backplane, the disclosed backplane 170 implemented in the various described and contemplated embodiments utilizes a modified, redundant Ethernet signaling arrangement that does not use Ethernet switching between the devices coupled to the backplane and does not modify the messages between the sending and receiving parties coupled to the backplane. In fact, in embodiments, the packets remain unchanged or are changed only slightly between the EMCs 152 and the controller to/from which the data are transmitted. That is, while some extra information may be added to the packets between the EMCs 152 and the controller, the packets are neither converted nor reconstructed, and the source and destination addresses are preserved.

Figures 10A, 10B:
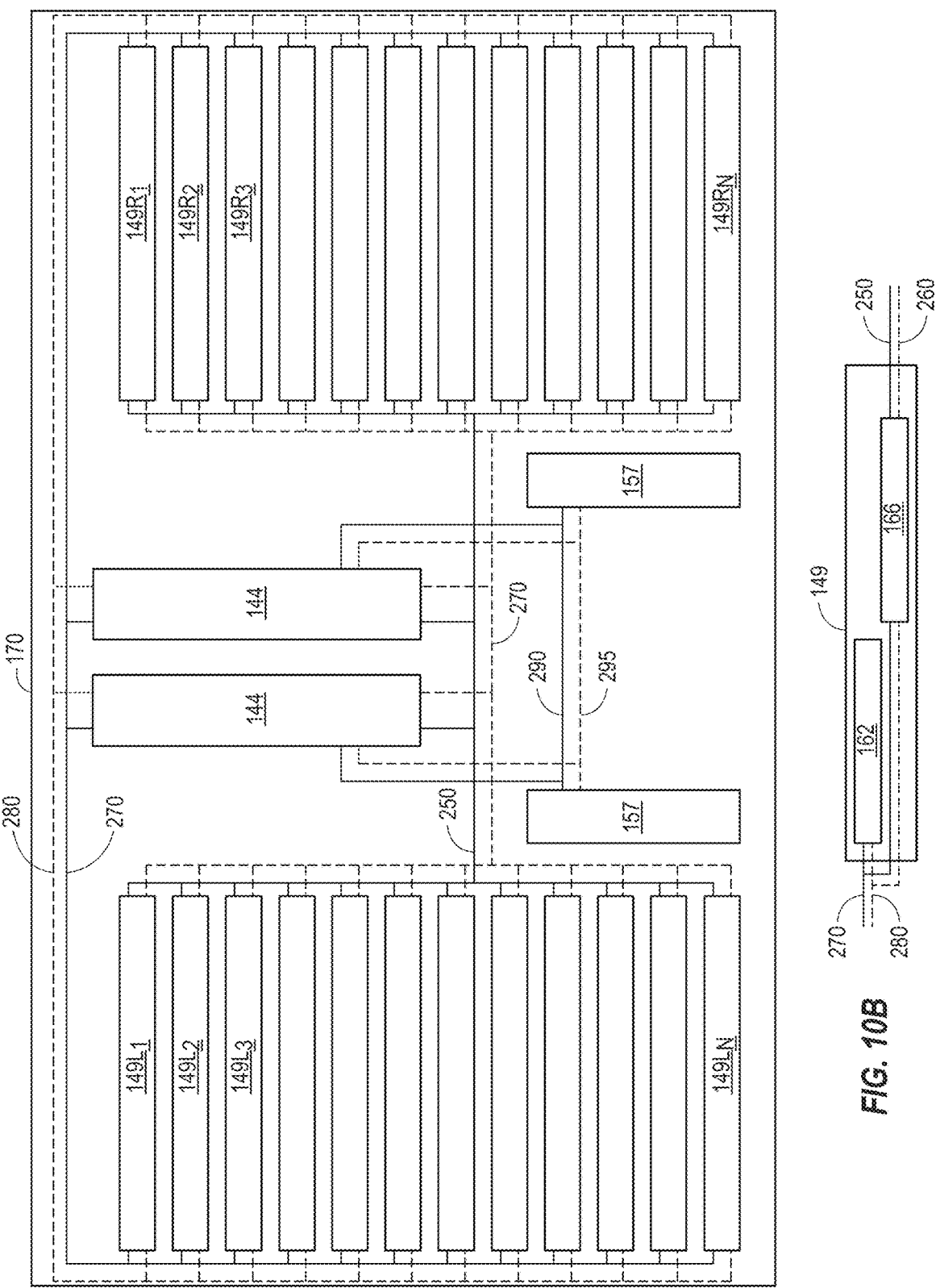
FIG. 10A is a block diagram illustrating a wiring configuration of a backplane according to the described embodiments.
FIG. 10B is a block diagram illustrating a wiring configuration of a slot coupled to the backplane according to the described embodiments.

FIGS. 10A and 10B illustrate various aspects of the backplane 170. It should be noted that FIGS. 10A and 10B are not to scale. The backplane 170 provides highly redundant communication between the devices coupled to the backplane 170. Each of the EMC slots 149, the communication port slots 156, and the I/O processor module slots 144 is coupled to the backplane 170. A primary, high-speed data bus 250 and secondary, high-speed data bus 260 couple each of the EMC slots 149 to each of the I/O processor module slots 144 and, in particular, couple the third connector 166 (i.e., the high-speed EMC connector) in each of the slots 149 to the I/O processor module slots 144. At the same time, primary and secondary conventional buses (270 and 280, respectively) also couple each of the EMC slots 149 to each of the I/O processor module slots 144 and, in particular, couple the second and third connectors 162, 166 (i.e., both the conventional EMC connector and the high-speed EMC connector) in each of the slots 149 to the I/O processor module slots 144. A primary transceiver bus 290 and secondary transceiver bus each communicatively couple the I/O processor module slots 144 to the communication port slots 156.

The backplane 170 takes advantage of the constrained nature of the backplane 170 to implement its redundancy. In particular, the path length of each bus is configured such that communication latency between elements communicating over the buses is known, if not identical. (It is identical or within one or two bit-times in embodiments.) Because of these constraints, an element (e.g., an EMC 152, an I/O processor module 145, or a communication port 157) transmitting on a bus can transmit on both the respective primary bus and the respective secondary bus simultaneously and the receiving element, receiving both copies of the transmission at the same time, can evaluate the validity of each in parallel. If the copy of the transmission received on the respective primary bus is corrupted (e.g., if there is a frame or CRC error), the copy of the transmission received on the secondary bus can be used and, because they are processed in parallel, the processor of the receiving element receives the copy of the transmission from the secondary bus one bit-time later (i.e., the length of time it takes to determine that the copy of the transmission received on the primary bus was corrupt). In embodiments, the redundancy and, in particular, the evaluation and forwarding of the redundant signals received on primary and secondary buses is implemented in hardware (i.e., in the hardware of the EMC 152 and the hardware of the I/O processor modules 145) rather than in software.

Moreover, because the backplane 170 is physically constrained, there is no need for implementation of any switching on the backplane 170. Instead, a timing signal can be used to create a fixed number of timing slots, and each device on a given set of primary and secondary buses can be assigned one or more of the time slots in which to transmit. That is, the backplane 170 and the various devices on it can implement a time-division multiplexing scheme such that each transmits only during its assigned timeslot(s), and does so simultaneously on both the primary and secondary buses.

In a particular embodiment, respective timing signals are transmitted by the I/O processor modules 145 (and, in particular, by the primary I/O processor module 145 in redundant arrangements) over the primary and secondary conventional buses 270, 280. The primary and secondary conventional buses 270, 280 are utilized for both link control functions and data for EMCs (i.e., conventional EMCs) connected to the second connectors 162, and are utilized only for link control functions for EMCs (i.e., high-speed EMCs) connected to the third connectors 166. The I/O processor module 145 also assigns one or more time slots to each of the devices (i.e., both conventional and high-speed EMCs) that will be transmitting on the primary and secondary conventional buses 270, 280, and assigns one or more time slots each of the devices (i.e., high-speed EMCs) that will be transmitting on the primary and secondary high-speed buses 250, 260. In embodiments, the time-division multiplexing is set up such that there is one time slot for each of the EMC slots 149 and one time slot for each of the I/O processor module slots 144. Thus, in the embodiment depicted in FIG. 3, there would be 26 time slots. (24 time slots for the maximum of 24 EMCs 152 that can be populated on the I/O device 140, and 2 time slots for the maximum of two I/O processor modules 145 that can be populated on the I/O device 140.) Thus, each EMC 152 may be configured (by the I/O processor module 145, using the primary and secondary conventional buses 270, 280) to transmit on the primary and secondary conventional buses 270, 280 and/or on the primary and secondary high-speed buses 250, 260 (for high-speed EMCs) for a single time slot when the I/O device 140 is fully populated with 24 EMCs 152. However, when fewer than the maximum number of EMCs 152 are populated on the I/O device 140, additional time slots may be allotted to one or more of the EMCs 152 on respective conventional and/or high-speed buses. This may allow those one or more EMCs 152 to transmit jumbo frames. Each EMC 152 on the I/O device 140 is therefore individually configurable (by the I/O processor module 145, using the primary and secondary conventional buses 270, 280) as to during which time slot(s) the EMC 152 should transmit, and each EMC 152 buffers its data and transmits only during its assigned time slot(s). Because of these known constraints, the I/O processor module 145 may automatically detect an occurrence of a so-called "babbling idiot" (i.e., a malfunctioning node sending data at inappropriate times and interfering with the communication of the properly functioning nodes) and may disconnect the improperly-functioning EMC 152 or cause it to be disconnected and/or to stop transmitting data—by sending commands over the primary and secondary conventional buses 270, 280—from the primary and secondary data buses 250, 260 and/or from the primary and secondary conventional uses 270, 280.

As will be understood, the primary and secondary conventional buses 270, 280 are used by high-speed EMCs 154 for out-of-band communications between the devices and, in particular, between the EMCs 152 and the I/O processor modules 145, and are used by conventional EMCs 158 for all communication between the devices, including data intended to be communicated, by the I/O processor module 145, between the EMCs 158 and the controllers 11. The conventional buses 270, 280 carry information related to diagnostics, configuration, power management (e.g., setting per-port high- or low-power for the field power provided by the EMCs 152 to the field devices, or powering off the field devices) and traffic management (including prioritization), and carry process control data for conventional EMCs 158. The high-speed buses 250, 260 carry data (i.e., process control data) intended to be communicated, by the I/O processor module 145, between high-speed EMCs 154 and the controllers 11.

Redundancy arrangements similar to those described above between the EMCs 152 and the I/O processor modules 145 may be implemented between the I/O processor modules 145 and the communication ports 157, using, respectively, primary and secondary (i.e., redundant) buses 290, 295 implemented between those devices.

In each of the EMC slots 149, the primary and secondary conventional buses 270, 280 are each connected to both the second set of connectors 162 (for the conventional EMCs 158) and the third set of connectors 166 (for the high-speed/APL EMCs 154) (as illustrated in FIG. 10B), and to the slots 144 for the I/O processor modules 145. At the same time, the primary and secondary high-speed buses 250, 260 are each connected to the third set of connectors 166 and to the slots 144 for the I/O processor modules 145. It is because of this, in part, that the EMCs 152 are hot-swappable—a conventional EMC 158 can be replaced with another conventional EMC 158 or with a high-speed/APL EMC 154, or vice versa. Upon connection, the I/O processor module 145 can configure the EMC 152 over the primary and secondary conventional buses 270, 280, without interrupting high-speed data flow between the high-speed EMCs 154 and the I/O processor module 145.

As will be understood, the redundant backplane described, while described with respect to the I/O device 140, can be used in other contexts that do or do not include EMC slots 149 that can accept conventional EMCs 158 and high-speed/APL EMCs 154. For example, an I/O device 140 that accepts only high-speed/APL EMCs 154 could utilize a backplane adhering the concepts described herein and, in particular, could implement a plurality of EMC slots configured to receive only high-speed EMCs, connecting the high-speed EMCs to the I/O processor modules using two sets of redundant buses—a set of high-speed redundant buses for process control data and a set of conventional or lower speed redundant buses for out-of-band control of the high-speed/APL EMCs.

As should be understood from the description above, the EMCs 152 may include, without limitation, conventional EMCs 158 such as those that perform analog input (AI) signal processing via a 4-20 mA communication protocol and physical layer, analog output (AO) signal processing via a 4-20 mA protocol and physical layer, discrete or digital output (DO) signal processing to and from field devices that use, for example, a HART communication protocol and physical layer, discrete or digital input (DI) signal processing to and from such field devices, and/or may include high-speed EMCs 154 that are associated with an advanced physical layer (APL) or that support other communication protocols (such as any IP-based communication protocol) for communicating with field devices.

While the input/output devices described herein are generally described as using an APL physical layer to support more traditional IP-based communication networks, these I/O devices could use any other physical layer that supports any general purpose IP-based communication protocol, such as an Ethernet physical layer, etc. Still further, the I/O devices described herein could support any desired combination of physical layers and communication protocols, including combinations of one or more traditional process communication physical layers (e.g., HART, FOUNDATION Fieldbus, PROFIBUS, CAN, etc.) with one or more general purpose IP physical layers (e.g., the APL physical layer, an Ethernet physical layer, etc.) and protocols (IP-based protocols, Ethernet protocols, HART-IP protocols, OPC UA protocols), etc. Moreover, the I/O devices described herein could support combinations of two or more traditional process control physical layers and communication protocols (e.g., the HART and Fieldbus physical layers and protocols), or combinations of two or more traditional or general purpose IP physical layers and protocols.

Thus, as can be seen, the input/output device described herein enables or provides support for field device communications using a single input/output device that supports multiple different physical layers, and that supports the use of different communication protocols via the different physical layers. This input/output device there by enables new types of field devices (e.g., field devices that communicate using more traditional IP-based communications) to be easily and seamlessly supported within a process plant. Moreover, this I/O device enables different types of field devices (i.e., field devices that use different physical layers and different communication protocols) to be integrated under and supported by the same I/O device. Still further, because this I/O device uses hardware configurable modules to connect field devices and field device networks to the I/O device, the field device networks can be configured on the fly so that different physical layers that support different communication protocols can be connected to the I/O device at any desired location or terminal block on the I/O device, an appropriate hardware module or EMC module appropriate for the communication protocol and physical layer can be inserted into the slot associated with the terminal block and the EMC module can automatically detect the type and identity of the field devices now connected to the EMC module via the physical layer. The EMC module can then provide this configuration information to the I/O processor module of the I/O device which can register the correct path and communication protocol to use to communicate with the detected field devices and can provide this configuration information to the controller which can use this path and protocol information to communicate with the field devices. Moreover, the controller can provide this configuration information to a configuration database and populate that database with field device information as the field devices are connected to the I/O device and the configuration information is detected. Still further, while many of the example I/O devices described herein are illustrated as including two or more I/O processor modules, with one processing module generally being used to support one type of physical layer and communication protocol, the I/O devices described herein could have a single processing module associated therewith that connects to different field devices via two or more internal buses and this single I/O processor module may support multiple (two, three, etc.) different physical layers and communication protocols.

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software.

Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

We claim:

1. An I/O device configured to couple a plurality of process control field devices to a process controller controlling a process in an industrial process plant, the I/O device comprising:
    a backplane;
    a plurality of electronic marshalling component (EMC) slots, each of the EMC slots configured to receive a respective EMC, and each of the EMC slots configured to receive either of (i) a first-type EMC associated with a first communication protocol and an associated discrete terminal block by coupling to a first one or more connectors or (ii) second-type EMC associated with a second communication protocol and having an integrated terminal block by coupling to a second one or more connectors;
    one or more I/O processor module slots, each of the one or more I/O processor module slots communicatively coupled, via the backplane, to each of the plurality of EMC slots and to each of the first one or more connectors and the second one or more connectors in each of the plurality of EMC slots; and
    one or more communication ports, each communicatively coupled to each of the one or more I/O processor module slots via the backplane, and each configured to communicatively couple the each of the one or more I/O processor module slots to the process controller.

2. An I/O device according to claim 1, wherein each of the EMC slots comprises:
    a card-edge connector disposed in the slot to physically and communicatively couple to a second-type EMC; and
    a first plurality of conventional connectors disposed in the slot and configured to communicatively couple to field wiring of the plurality of process control field devices; and
    a second plurality of conventional connectors disposed in the slot and configured to communicatively couple to a first-type EMC.

3. An I/O device according to claim 1, wherein the first-type EMC is a conventional EMC.

4. An I/O device according to claim 1, wherein the second-type EMC is an advanced physical layer (APL) EMC.

5. An I/O device according to claim 1, further comprising a plurality of APL EMCs installed in a first subset of the plurality EMC slots and a plurality of conventional EMCs installed in a second subset of the plurality EMC slots, each of the conventional EMCs and the APL EMCs including a memory and a processor for performing communications.

6. An I/O device according to claim 2, wherein the backplane is configured to communicate, for each EMC slot, signals between the first plurality of conventional connectors and a subset of the second plurality of conventional connectors.

7. An I/O device according to claim 2, wherein the backplane is configured to communicatively couple each EMC slot to each of the I/O processor module slots.

8. An I/O device according to claim 7, wherein the backplane is configured to communicatively couple, for each EMC slot, one or more connections on the card-edge connector and one or more of the second plurality of conventional connectors to each of the I/O process module slots.

9. An I/O device according to claim 2, further comprising a plurality of slot adapters, each of the slot adapters configured to (i) cover a respective card-edge connector in one of the EMC slots and (ii) facilitate seating and latching of a respective first-type EMC.

10. An I/O device according to claim 2, wherein each of the EMC slots further comprises a terminal latch, the terminal latch configured to physically engage with a first-type EMC and to facilitate seating and latching of the first-type EMC.

11. An I/O device according to claim 1, wherein the plurality of EMC slots comprises a first array of EMC slots and a second array of EMC slots.

12. An I/O device according to claim 1, wherein the plurality of EMC slots comprises 24 EMC slots.

13. An I/O device according to claim 1, wherein each of the EMC slots is configured such that, when the EMC slot receives a second-type EMC, the second-type EMC covers and does not communicatively or physically engage with connectors configured to communicate signals to and/or from a first-type EMC.

14. An I/O device according to claim 1, wherein each of the EMC slots is configured such that, when the EMC slot receives a first-type EMC, the first-type EMC does not cover, communicatively engage, or physically engage with a connector configured to couple to a second-type EMC.

15. An I/O device according to claim 1, wherein a first array of EMC slots is disposed on a left side of the I/O device, a second array of EMC slots is disposed on a right side of the I/O device, and the one or more I/O processor slots and the one or more communication ports are disposed in a central portion of the I/O device between the left side and the right side.

16. An I/O device according to claim 1, wherein each of the plurality of EMC slots is configured to facilitate linear insertion of a second-type EMC, and to facilitate pivoting insertion of a first-type EMC.

17. An I/O device according to claim 1, wherein the each of the plurality of EMC slots has a same length dimension and a same width dimension as a first-type EMC slot configured to receive a terminal block for a first-type EMC.

18. An I/O device according to claim 17, wherein each of the EMC slots comprises:
- a set of pogo terminals disposed in the slot to communicatively couple to a second-type EMC;
- a first plurality of conventional connectors disposed in the slot and configured to communicatively couple to field wiring of the plurality of process control field devices; and
- a second plurality of conventional connectors disposed in the slot and configured to communicatively couple to a first-type EMC.

19. An I/O device according to claim 1, wherein the one or more communication ports are disposed within a body of the I/O device such that the one or more communication ports couple to communication media from a bottom surface of the I/O device, and wherein a contiguous airflow path is created extending from the bottom surface of the body of the I/O device, through a body of each of the one or more communication ports, and through the body of the I/O device.

20. An electronic marshalling component (EMC) configured to communicatively and physically couple to any one of the plurality of EMC slots of the I/O device of claim 1.

* * * * *